Jan. 21, 1941. C. A. NERACHER ET AL 2,229,337
POWER TRANSMISSION
Filed Jan. 21, 1938 9 Sheets-Sheet 1
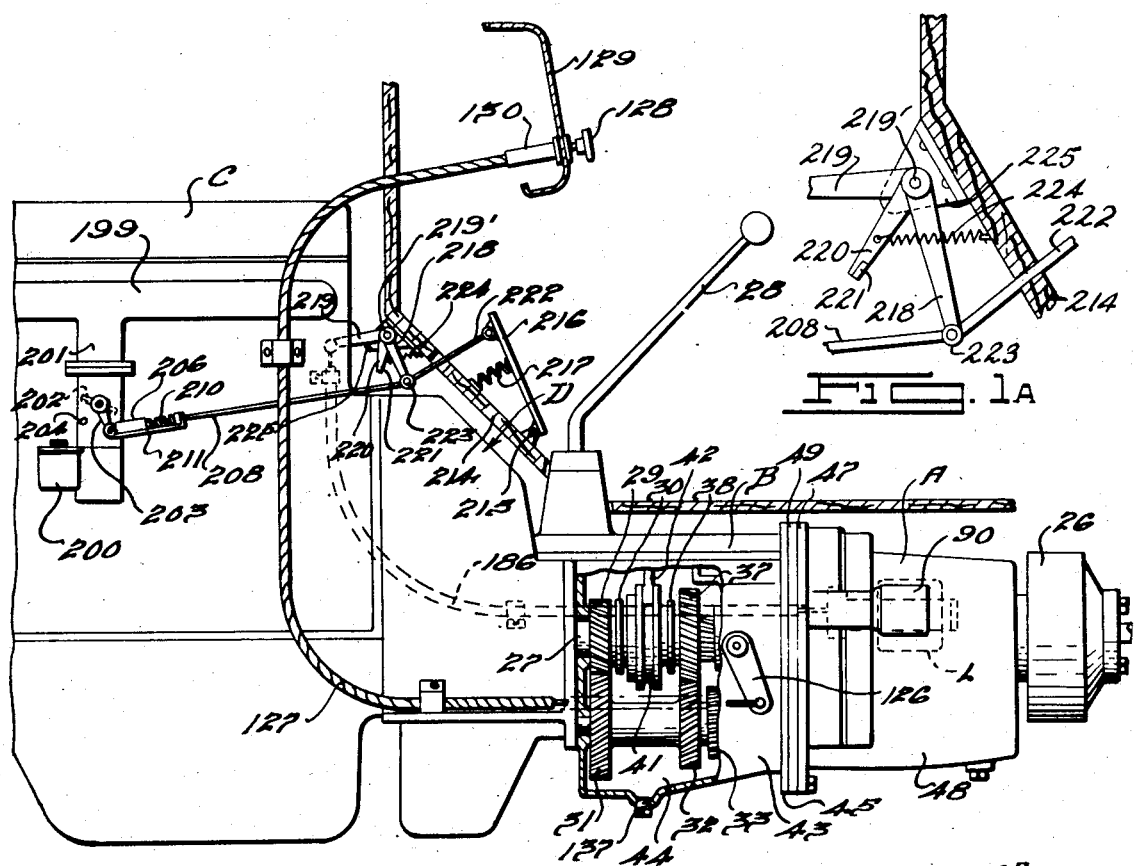
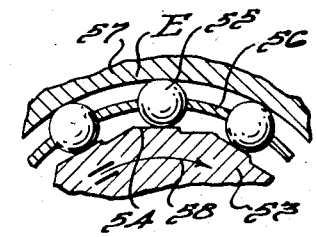
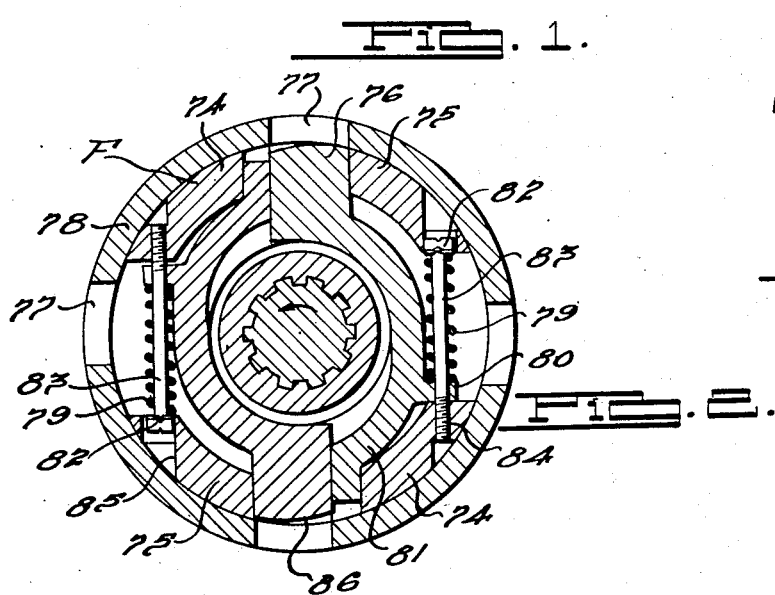
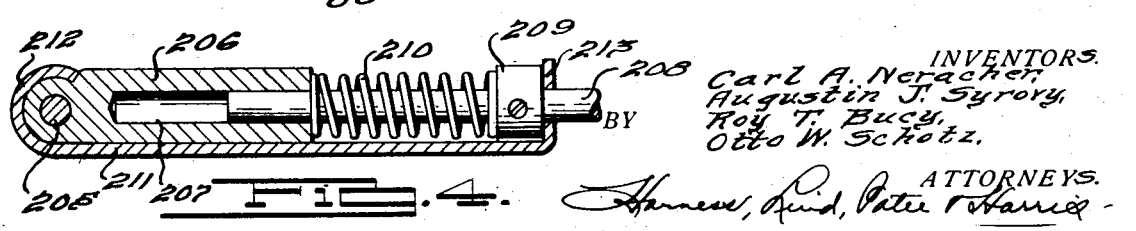
INVENTORS.
Carl A. Neracher,
Augustin J. Syrovy,
Roy T. Bucy,
Otto W. Schotz.
BY
ATTORNEYS.

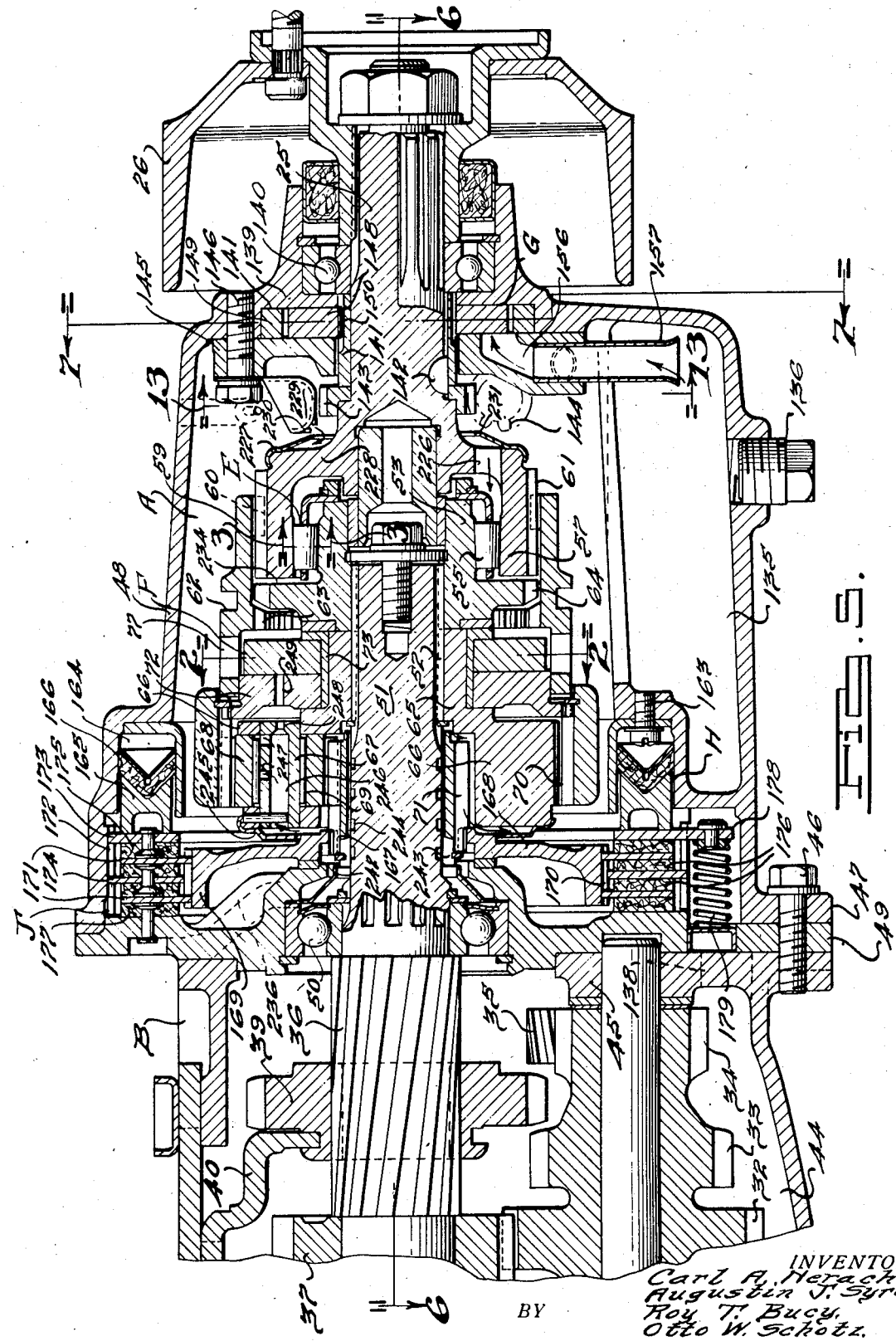

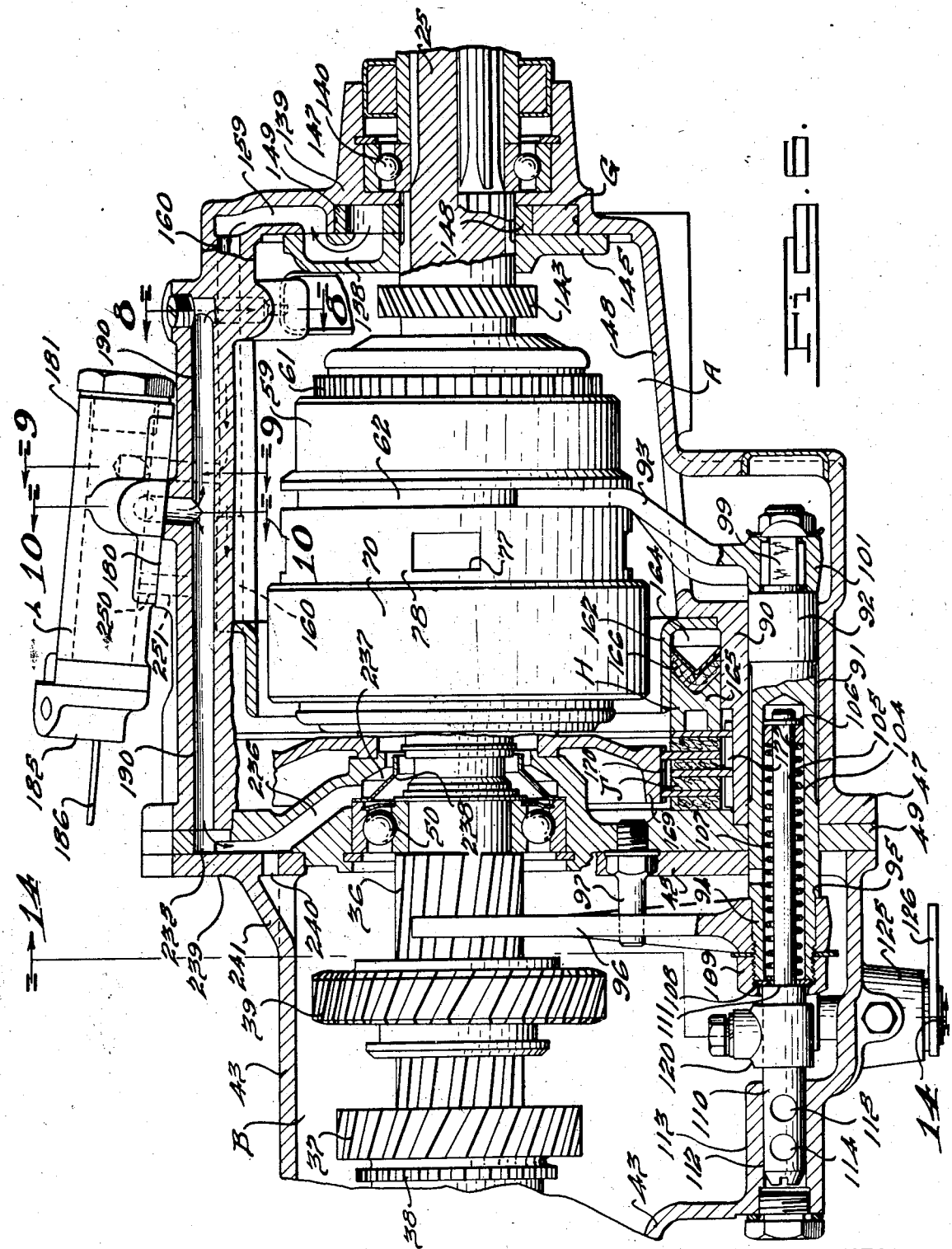

Jan. 21, 1941.  C. A. NERACHER ET AL  2,229,337

POWER TRANSMISSION

Filed Jan. 21, 1938   9 Sheets-Sheet 4

INVENTORS.
Carl A. Neracher,
Augustin J. Syrovy,
Roy T. Bucy,
Otto W. Schotz.

BY

Harness, Dickey, Pierce & Harris
ATTORNEYS.

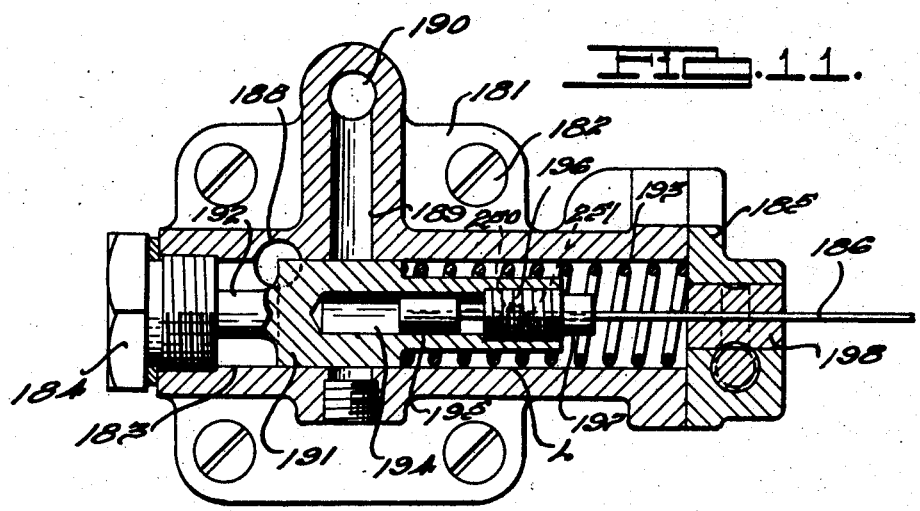
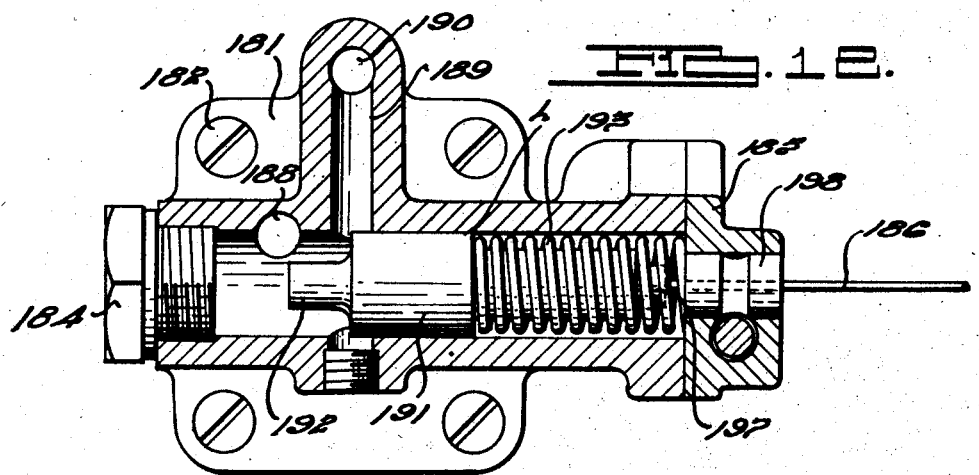
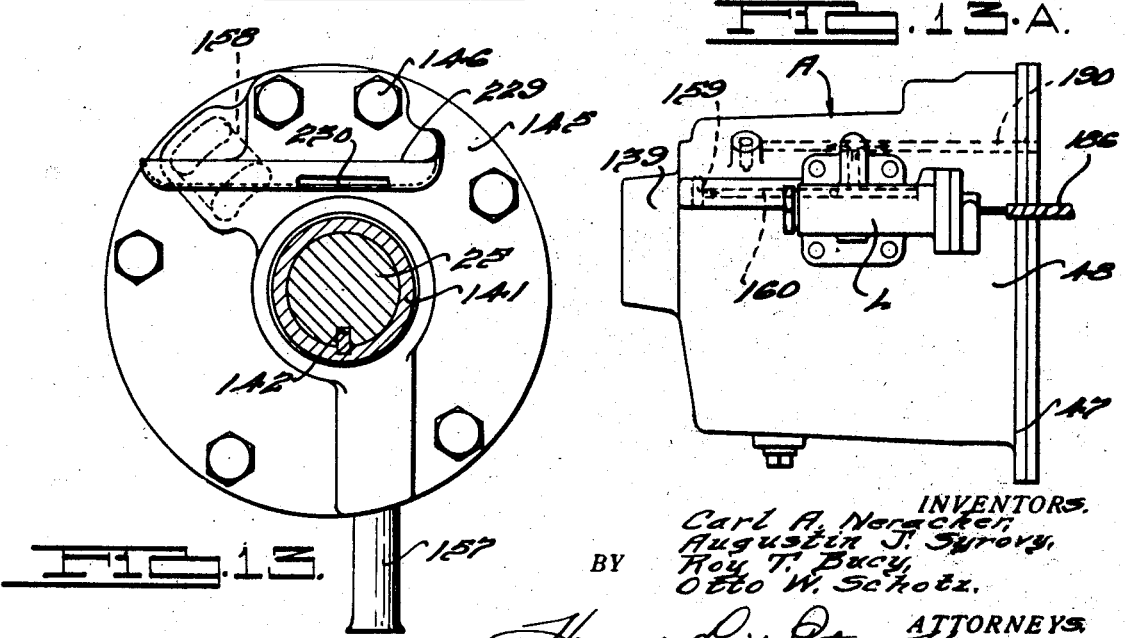

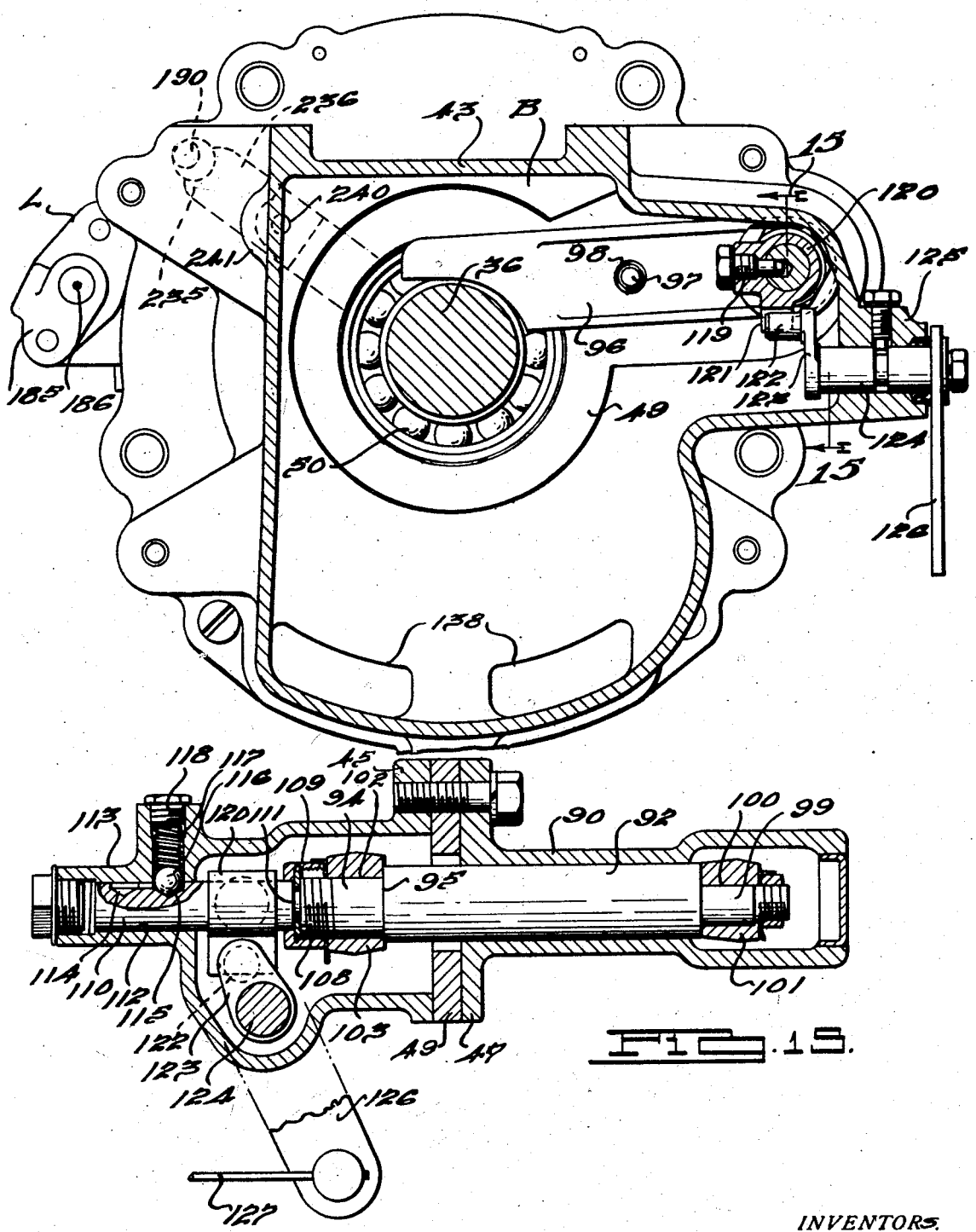

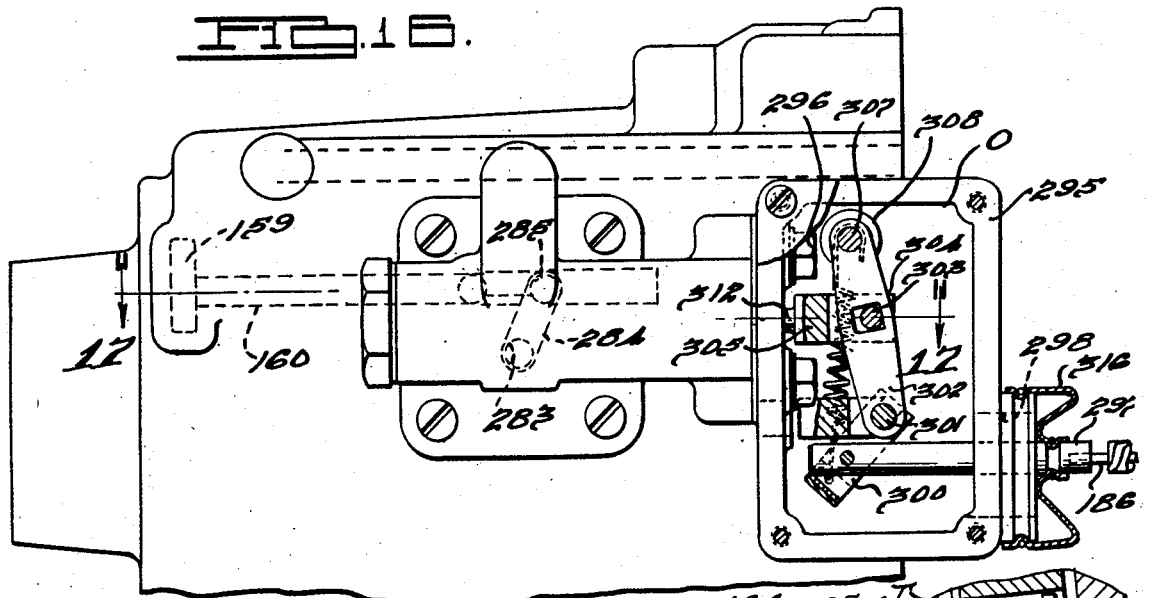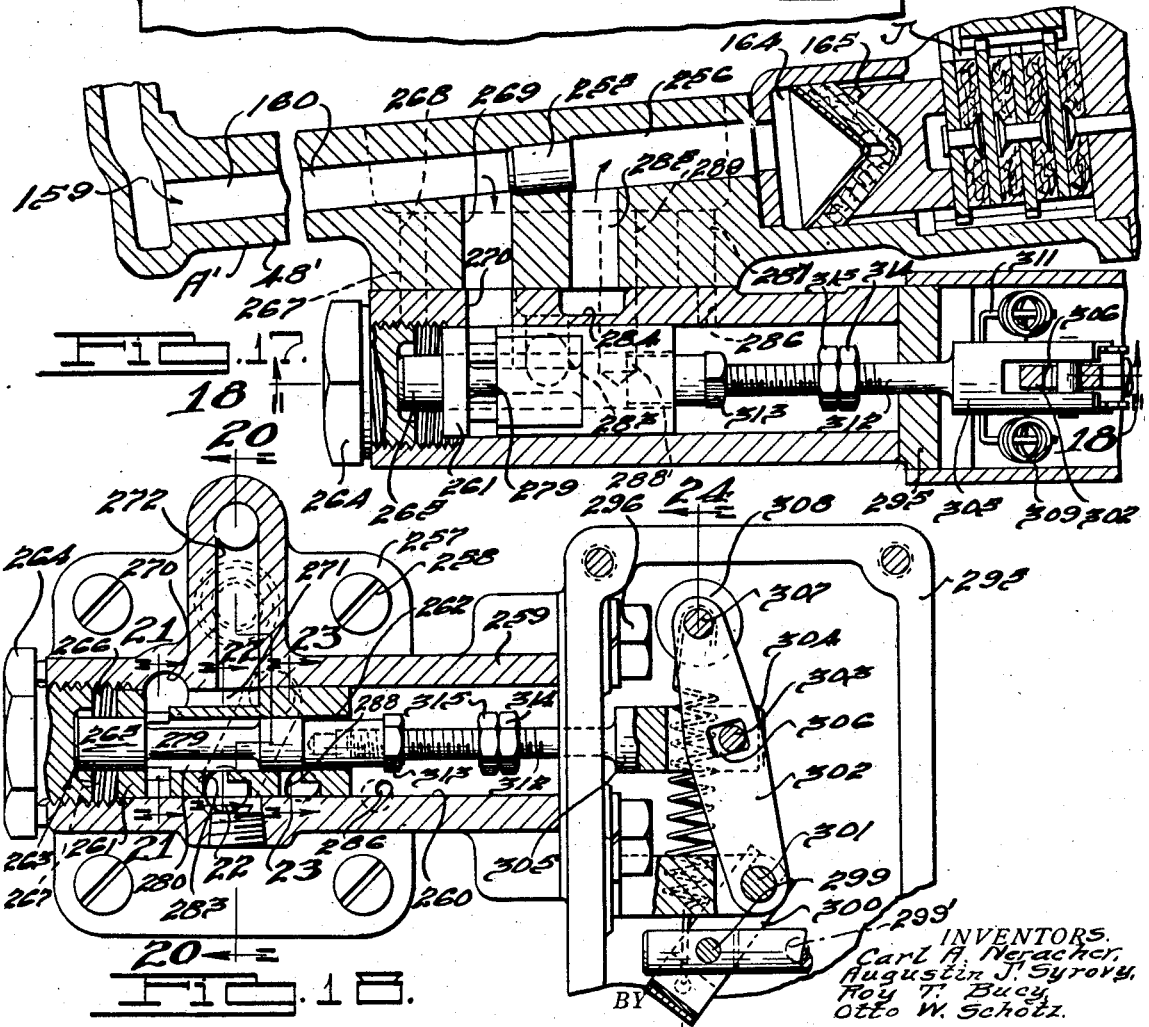

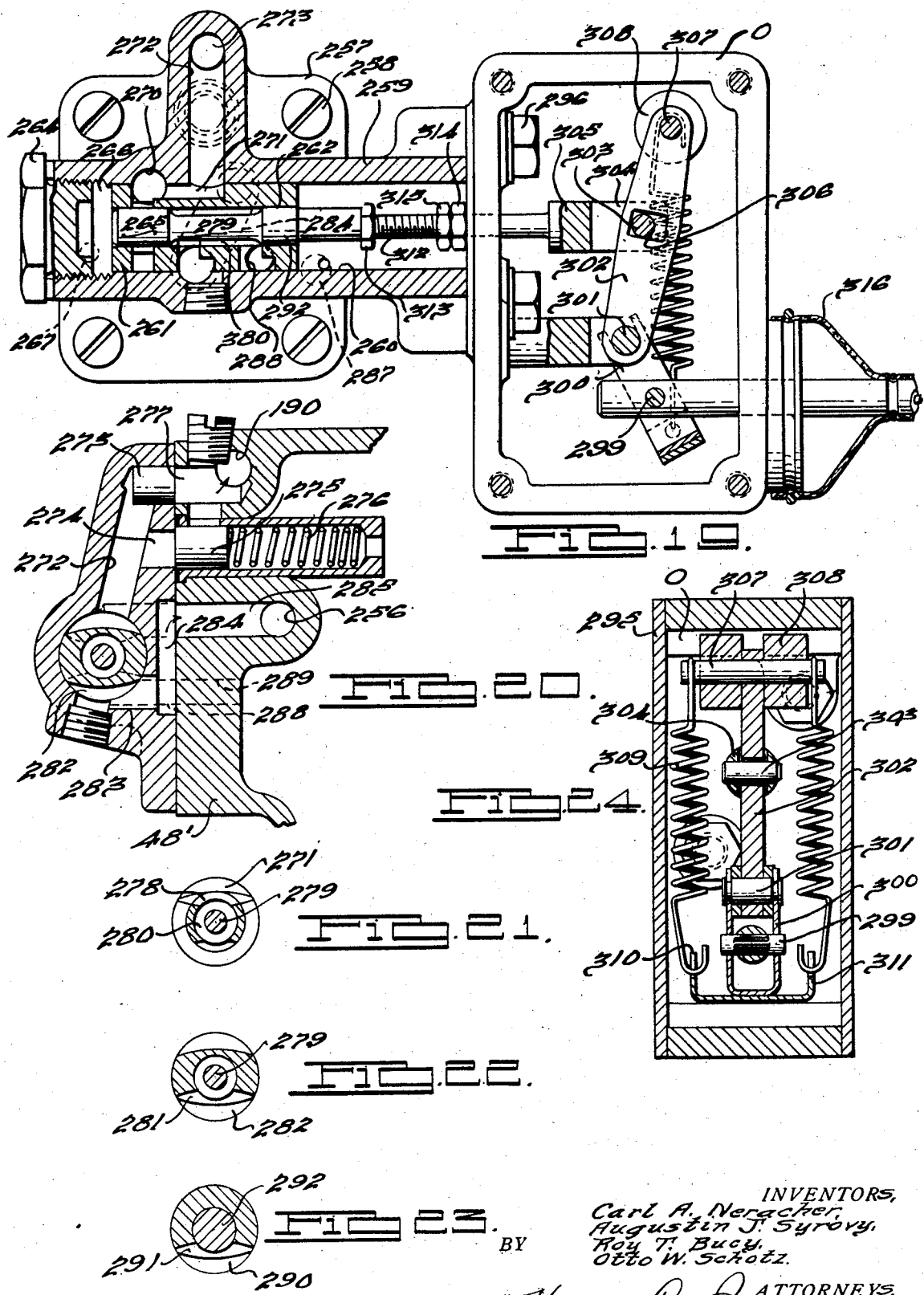

Patented Jan. 21, 1941

2,229,337

UNITED STATES PATENT OFFICE 2,229,337

POWER TRANSMISSION

Carl A. Neracher, Augustin J. Syrovy, Roy T. Bucy, and Otto W. Schotz, Detroit, Mich., assignors to Chrysler Corporation, Highland Park, Mich., a corporation of Delaware Application January 21, 1938, Serial No. 186,146

38 Claims. (Cl. 74—472)

This invention relates to power transmissions and refers more particularly to improvements in speed ratio changing mechanism especially adapted for use in driving motor vehicles.

More particularly, our invention relates to change speed transmissions wherein the speed ratio drive for the vehicle is changed by an improved arrangement of control mechanism.

While our invention is applicable, in the broader aspects thereof, to a variety of speed ratio gearing arrangements to provide speed changes above or below a direct drive from the transmission drive shaft to the vehicle drive shaft, we have illustrated the principles of our invention in connection with an overdrive mechanism wherein the driven shaft is at times driven faster than that of the driving shaft.

The advantages of overdrive are well known in the art, especially since overdrive mechanisms have been used commercially in recent years. One type of overdrive, which is well known at this time, comprises a planetary gearing and automatic synchronous centrifugal force clutch control so arranged that when the engine drives in the direct speed ratio, viz. 1 to 1, at or above the critical speed of engagement of the centrifugal clutch, this clutch may be engaged by momentarily reducing the speed of the engine by the amount of the overdrive gear train in order to synchronize the clutch members to establish the overdrive. The clutch is disengaged when the vehicle speed is reduced to some predetermined desired point below its speed corresponding to the critical speed of engagement of the automatically operating clutch.

One disadvantage of the foregoing type of overdrive, in common with other types of overdrives and many change speed devices in general, is that when the vehicle is driven in the fastest speed ratio drive the engine torque is relatively low in comparison with slower speed ratio drives and the engine lacks the desired power for quickly passing another vehicle or for climbing a hill.

It is an object of our invention to provide a change speed mechanism wherein speed ratio drives may be conveniently and quickly changed by the vehicle driver preferably in response to manually operable mechanism such as the usual engine throttle-adjusting accelerator pedal. Our mechanism is preferably so arranged that the accelerator pedal may be depressed to overtravel the engine throttle when fully open to thereby manipulate the change speed mechanism for drive in a slower speed ratio, such arrangement being conveniently termed a "kick-down" control. We preferably employ an accelerator pedal control since the driver ordinarily has his foot on this pedal and naturally depresses the pedal when further power delivery from the engine to the vehicle is desired.

Another object of our invention is to provide a driver controlled change speed mechanism, preferably in the form of a kick-down control, wherein the fastest speed ratio may be an overdrive synchronously controlled by automatic clutch means adapted for operation at a predetermined speed of vehicle travel. With such an arrangement the critical speed of the clutch means may be set relatively low because when the overdrive is in operation there is instantly and conveniently available a control on the change speed mechanism to obtain a slower and more powerful drive so that the benefits of economy, quietness and the like may be obtained by using the overdrive throughout a greater range of vehicle speed than might otherwise be deemed practicable. Obviously, however, the overdrive may be arranged to be operative at any speed desired and may be automatically or manually controlled.

Another object of our invention is to provide an improved pressure fluid control for the change speed mechanism, preferably by incorporating a lubricating system in conjunction with the kick-down mechanism.

Additional objects of our invention, according to modification thereof, are to provide an improved change speed mechanism of the character aforesaid wherein, once the speed ratio is changed by the accelerator pedal overtravel, the previous speed ratio is not restored by release of the pedal for the overtravel movement but in response to further throttle closing movement of the pedal; and to provide a snap-action or equivalent mechanism for operating the pressure fluid valving control means from the accelerator pedal.

Further objects of our invention are to provide an improved lubricating system for our power transmission insuring constant lubrication of the working parts in an efficient manner; to provide an improved mechanism for locking out the overrunning clutch to couple the driving and driven shafts for a two-way drive either in response to driver control when setting the mechanism for reverse or at other times; and to provide improved control means for planetary gearing whereby speed ratio changes may be effected in an improved manner.

Other objects of our invention are to provide change speed mechanism automatically operable to provide varying speed ratios best suited to the requirements or conditions of motor vehicle drive. By reason of our invention the vehicle is operated very efficiently without sacrificing rapid accelerating ability.

Further objects and advantages of our invention will be more apparent as our specification progresses, reference being had to the accompanying drawings which illustrate several embodiments of our invention and wherein:

Fig. 1 is a side elevational view, somewhat diagrammatic in form, illustrating our power transmission system as a whole, a portion of the casing of the main speed ratio changing transmission being broken away to illustrate the gearing.

Fig. 1A is a fragmentary enlarged portion of the Fig. 1 showing.

Fig. 2 is a sectional elevational view taken as indicated by the line 2—2 of Fig. 5 illustrating the automatically operating speed responsive clutch forming the primary controlling means for the overdrive gearing mechanism.

Fig. 3 is a detail fragmentary sectional elevational view taken as indicated by the line 3—3 of Fig. 5 illustrating the overrunning clutch which forms a direct drive releasable connection between the driving and driven shafts of the overdrive mechanism.

Fig. 4 is a detail sectional elevational view of a portion of the engine throttle valve adjusting mechanism illustrated in Fig. 1.

Fig. 5 is a sectional elevational view through the overdrive mechanism and a portion of the main speed ratio changing transmission.

Fig. 6 is a sectional plan view taken approximately as indicated by the line 6—6 of Fig. 5 but deviating therefrom sufficiently to illustrate a portion of the pressure fluid supply system for the overdrive mechanism.

Fig. 11 is a sectional elevational view of the valving means illustrated in the position thereof corresponding to a position of rest of the pressure fluid supply means.

Fig. 12 is a view similar to Fig. 11 but illustrating the valving means in the normal position thereof accommodating the overdrive and wherein the pressure fluid supply means is operating to supply pressure fluid to the valving means.

Fig. 13 is a detail sectional elevational view taken as indicated by line 13—13 of Fig. 5 illustrating a portion of the lubricating system shown in Fig. 8.

Fig. 13A is a side elevational view in diagrammatic outline form illustrating the overdriving mechanism and looking at the side thereof opposite to that viewed in Fig. 1.

Fig. 14 is a sectional elevational view taken as generally indicated by the line 14—14 of Fig. 6.

Fig. 15 is a detail sectional elevational view taken as indicated by the line 15—15 of Fig. 14.

Fig. 16 is a side elevational view of an overdriving mechanism substantially identical with the Fig. 13A showing but illustrating in similar manner a somewhat modified form of valving means.

Fig. 17 is a sectional plan view of the Fig. 16 illustration taken along line 17—17 of Fig. 16.

Fig. 18 is a sectional elevational view taken as indicated by line 18—18 of Fig. 17.

Fig. 19 is a view similar to Fig. 18 but illustrating the parts in the kick-down position.

Fig. 20 is a sectional elevational view taken as indicated by line 20—20 in Fig. 18.

Fig. 21 is a detail sectional view illustrating the porting sleeve structure, the view being taken at line 21—21 of Fig. 18.

Figs. 22 and 23 are respectively views similar to Fig. 21 but taken at lines 22—22 and 23—23 of Fig. 18.

Fig. 24 is a sectional elevational view taken approximately as indicated by line 24—24 of Fig. 18.

Figure 25:
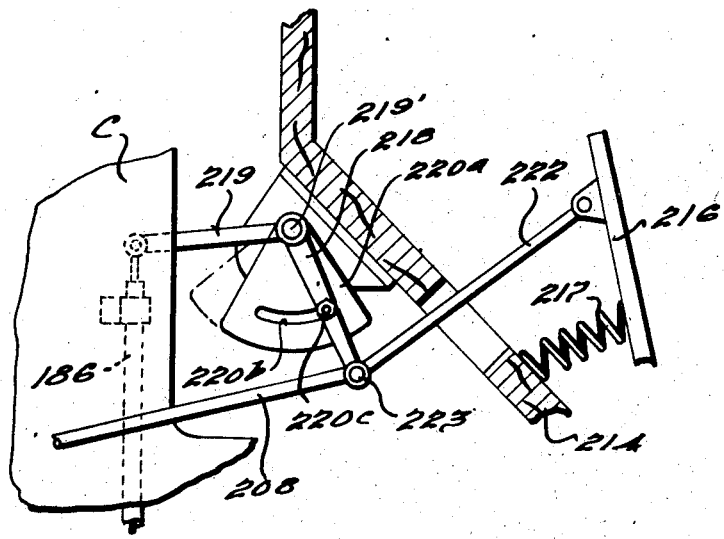

Fig. 25 is a fragmentary sectional elevational view illustrating the accelerator pedal control for the Fig. 16 arrangement.

Figure 26:
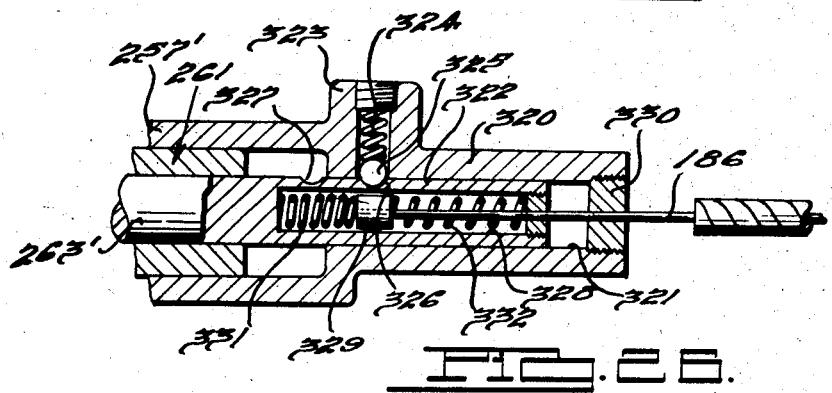

Fig. 26 is a detail sectional elevational view of a modified form of operating means for the Fig. 16 valving means.

Figure 27:
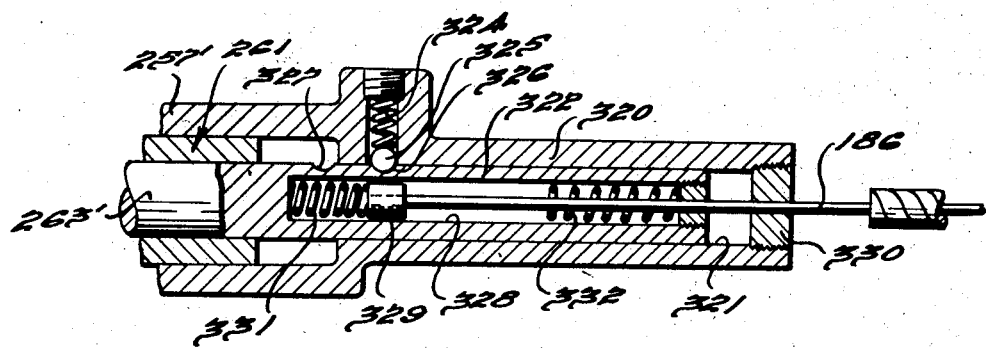

Fig. 27 is a view similar to Fig. 26 but illustrating a further modified valve operating means.

Referring to the drawings, we have illustrated our overdriving mechanism A interposed between a speed ratio changing main transmission B and a driven shaft 25, the latter extending rearwardly to drive the rear wheels (not shown) of the motor car or vehicle in the usual well known manner, it being understood that we have elected to show our invention in association with a motor vehicle drive although in its broader aspects, it is not necessarily limited thereto. The customary propeller shaft brake drum 26 is illustrated as comprising a part of the drive from the overdriving mechanism A to the vehicle.

Our driving mechanism may be used to advantage at various other points in the line of general power transmission between the vehicle engine C and the driven wheels, or between driving and driven means such as shafts of other types of devices. In accordance with customary practice, the drive from engine C to the main transmission B is controlled by a clutch D of any suitable type, this clutch transmitting the drive to the main transmission by a shaft 27.

The transmission B may be of any suitable type, such as the conventional selector type operated in the well known manner by manipulation in the gear shift lever 28 and the usual selector controls, whereby the various adjustments may be made to the transmission in order to provide forwardly driving speed ratios and a reverse drive through the transmission.

Inasmuch as the type of transmission illustrated at B is well known in the art, we have shown only a portion of the operating mechanism in Figs. 1, 5 and 6. Shaft 27 carries the countershaft driving pinion 29 and also the direct drive clutch teeth 30, pinion 29 meshing with the driving gear 31 of the countershaft cluster gearing which further includes a second speed drive gear 32, a low speed drive gear 33, and a gear 34 in constant mesh with a reverse idler gear 35.

Loosely mounted on the transmission power take-off shaft 36 for rotation relative to this shaft, is the usual second speed gear 37 in constant mesh with the countershaft gear 32, a set of second speed clutch teeth 38 being driven with gear 37.

Splined on the shaft 36 for shifting movement along this shaft is the low and reverse gear 39 shiftable by a fork 40 under control of the gear shift lever 28. When the gear 39 is shifted forwardly into mesh with countershaft gear 33, shaft 36 will be driven from shaft 27 in a forward low speed ratio drive through the gear train 29, 31, 33 and 39. When the gear 39 is shifted rearwardly to mesh with the reverse idler gear 35, shaft 26 will be driven backwards or in reverse relative to the forward direction of rotation of the shaft 27 through the gear train 29, 31, 34, 35 and 39.

In order to selectively drive shaft 36 in the second or intermediate speed ratio, and also in a direct drive, the usual shiftable clutch 41 is provided operable by the fork 42 under control of the gear shift lever 28, this clutch 41 being drivingly connected to the shaft 36 and adapted for selective forward and rearward shifting movements respectively to clutch with the direct drive clutch teeth 30 or the second speed drive clutch teeth 38. During the direct drive, shaft 27 drives the shaft 36 by reason of engagement of clutch teeth 30 with the corresponding teeth of the shiftable clutch 41. During the second speed drive the shaft 36 is driven at a reduction speed ratio greater than that provided by the low speed ratio drive, by reason of the gear train 29, 31, 32, 37, clutch teeth 38, and shiftable clutch member 41.

The main transmission B has the aforesaid gearing disposed within a casing 43 which provides a reservoir or sump 44 for storing a suitable lubricating oil which is preferably circulated, as will be presently more apparent, between the transmission B and the overdriving mechanism A and this lubricating oil is preferably used as the fluid medium for effecting operation of the secondary controlling means for the overdriving mechanism. The transmission casing 43 is formed with a rear annular wall 45 secured by fasteners 46 to the forward wall or flange 47 of the casing 48 for containing the overdriving mechanism A. Secured between walls 45 and 47 there is located an intermediate member 49.

The transmission shaft 36 is the driving shaft for the overdrive mechanism A and is journalled in a bearing 50 carried by the intermediate member 49, the shaft 36 having a rearward driving extension 51 which projects into the overdrive casing 48 and which is formed with splines 52.

Engaging splines 52 at the rear end of driving shaft extension 51, is the inner member 53 of an overrunning clutch E which provides a releasable forward direct driving means from shaft 36 to the driven shaft 25. As best shown in Figs. 3 and 5 the inner member 53 is formed with the usual cam faces 54 engaged by clutching rollers 55, the rollers being spaced by the usual cage 56. The outer member of the overrunning clutch E comprises a cylinder 57 formed as an enlarged forward projection of the driven shaft 25. When the driving shaft 36 has a forward direction of rotation imparted thereto, as indicated by the arrow 58 in Fig. 3, and with the overdriving mechanism inoperative, the rollers 55 will be wedged between the inner and outer member 53 and 57 respectively of the overrunning clutch E so that the driven shaft 25 will be driven in a forward direction with the driving shaft 36. However, in the event that the driving shaft tends to slow down relative to the driven shaft, or in the event that the driven shaft tends to rotate forwardly faster than the driving shaft, the rollers 55 will be released from wedging action and such tendencies of the shafts to rotate relatively to one another will be readily accommodated.

It will be apparent that in order to drive shaft 25 in a reverse direction from the shaft 36, as when the gear 39 is shifted rearwardly to mesh with the reverse idler gear 35 for driving the vehicle in reverse, some means must be provided to render the overrunning clutch E inoperative in order to establish a drive connection between these shafts. In the present embodiment of our invention, this is accomplished by reason of a shiftable clutch sleeve 59 having a set of splined teeth 60 slidably engaging the external splines 61 formed on the cylindrical member 57. The shiftable sleeve 59 is provided with an annular groove 62 adapted to receive a shifting element as will hereinafter be more apparent. The sleeve 59 is formed with a set of internal clutch teeth 63 adapted, upon rearward shifting movement of sleeve 59, to engage a second set of clutch teeth 64 conveniently formed as a portion of the overrunning clutch inner member 53 so that the teeth 64 are drivingly connected to the shaft extension 51.

Engaging the splines 52 forwardly of the overrunning clutch member 53, is the cylindrical hub portion 65 of a planet gear carrier 66 mounting a plurality of hollow shafts 67, one of which is illustrated in Fig. 5.

Each shaft 67 journals a planet gear 68 by an anti-friction bearing 69. The planet gears 68 are in constant mesh with an internal gear or annulus 70 and also with a sun gear 71 through which the shaft extension 51 passes for rotation relatively thereto.

Drivingly connected to the internal gear 70 is a pawl-carrying cage or core 72 of the automatic speed responsive clutch generally designated at F. The cage 72 is rotatably centered on the hub 65 preferably through an intermediate bushing 73.

The automatic clutch F is best illustrated in Fig. 2 wherein it will be noted that the cage 72 is formed with the pairs of diametrically opposite rearwardly extending projections 74 and 75 adapted to slidably guide the centrifugal elements or pawls 76 outwardly for positive synchronous clutching with one of the slots 77 of a companion clutching structure in the form of a cylindrical shell 78 formed as an integral forward extension of the shiftable sleeve 59.

Each pawl 76 is yieldingly urged inwardly or to its retracted declutched position of engagement with the bushing 73 as illustrated in Fig. 2 by a coil spring 79 which acts against the abutment 80 of the pawl counter-balancing yoke portion 81. The other end of each coil spring 79 engages an abutment 82 formed as the head of an adjustable bolt 83 which slidably projects through the abutment 80 for adjustable threaded connection at 84 with a cage projection 74. Each bolt head 82 is accessible for adjustment exteriorly of the automatic clutch by aligning one of the slots 77 with an opening 85 in which the bolt head 82 is disposed, and by rotatably adjusting the bolts 83 it will be apparent that the compression of the coil springs 79 may be varied to change the load upon the pawls 76 and thereby vary the critical speed at which the pawls will fly outwardly under centrifugal force acting thereon for clutching engagement with one of the slots 77. Each pawl 76 has an outer face which is cammed at 86 so that the pawls will jump the slots 77 when the pawls are urged outwardly by centrifugal force prior to synchronizing the speeds of rotation of the cage 72 and the shell 78.

In the operation of the overdriving mechanism A as thus far described, let it be assumed for the moment that the sun gear 71 is held against rotation and that the parts are positioned as illustrated in Fig. 5. The motor vehicle is accelerated from a position of rest by manipulating the main transmission B in the well known manner until, when shiftable clutch 41 is clutched with the direct driving clutch speed 30, the motor vehicle is driven as a direct drive from the engine through the main transmission B and also for a direct drive from shaft 36 through the overrunning clutch E to the driven shaft 25. For purposes of illustration, let it be further assumed that the critical speed of the automatic clutch F is such that the pawls 76 will be held inwardly by the coil springs 79 until the motor vehicle is driven at approximately forty miles per hour, so that when the vehicle is driven at or above this speed the pawls will be urged outwardly but cannot engage the slots 77 by reason of the relatively different speeds of rotation of the cage 72 and shell 78 in conjunction with the cammed pawl faces 86. Thus during this forward direct drive of the motor vehicle, the slots 77 are rotating forwardly at the same speed as that of the driven shaft 25 whereas the pawls 76 together with the cage 72 and internal gear 70 are rotating forwardly at a speed faster than that of the driven shaft by the amount of the overdriving planetary gearing ratio incident to driving the planet cage 66 at the speed of rotation of driving shaft 36 while holding the sun gear 71 relatively stationary.

When the motor vehicle is thus driven at or above the critical speed of operation of the automatic clutch F, the overdrive is brought into operation by a momentary reduction in the speed of the driving shaft 36, accommodated by overrun at the overrunning clutch E, this reduction in speed being conveniently brought about by the vehicle driver releasing or partially releasing the usual accelerator pedal with an accompanying throttle-closing operation at the engine C.

As the speed of rotation of the driving shaft 36 slows down, the pawls 76 will be synchronized with the shell 78 and at such time the pawls will fly outwardly for clutching engagement with one of the slots 77 to thereupon couple shafts 36 and 25 by a two-way drive connection through the planetary gearing.

As hereinbefore noted, this drive connection provides an overdrive from the driving shaft 36 to the driven shaft 25 and the vehicle will be driven from the engine to the planetary gearing, assuming that the sun gear 71 maintains its relatively stationary condition, until the speed of the motor vehicle is reduced appreciably below the aforesaid critical speed of automatic clutch engagement, at which time the coil springs 79 will operate to retract the pawls to the Fig. 2 position thereby releasing the drive through the planetary gearing and restoring the drive through the overrunning clutch E, it being apparent that this clutch will overrun during the aforesaid overdrive. By altering the adjustment of the bolts 83 or by replacing the coil springs 79 with other springs of differing values, it will be apparent that the automatic clutch may be made to function at any desired speed of the motor vehicle.

When it is desired to render the automatic clutch F as well as the overrunning clutch E inoperative, the shiftable sleeve 59 is shifted rearwardly to engage clutch teeth 63 thereof with the driving shaft clutch teeth 64 to thereby directly couple shafts 36 and 25 for a two-way drive therebetween. At the same time the slots 77 will be shifted rearwardly out of radial alignment with the pawls 76 so that the pawls cannot move outwardly to engage the slots coupled with the circumstance that the pawl cage 72 and shell 78 cannot be synchronized with the shafts 36 and 25 coupled for a two-way drive and with the sun gear 71 held stationary. As will presently be more apparent we have provided a secondary controlling means for the overdriving mechanism by reason of which the sun gear 71 may be released at the will of the vehicle driver and since the sun gear 71 takes the reaction of the overdrive, it will be apparent that when the sun gear is allowed to freely rotate the overdrive mechanism will be rendered inoperative even in the event that the automatic clutch F is engaged at the time of release of the sun gear.

We have also provided means responsive to rearward shift of the main transmission gear 39 into mesh with the reverse idler gear 35 for causing a rearward shift of the sleeve 59 to couple shafts 36 and 25 for the aforesaid two-way drive therebetween. We will now describe the reverse responsive shift of the sleeve 59 and also the further means under control of the vehicle driver for shifting this sleeve rearwardly at such times when the automatic clutch F is not in position of operation.

Referring now to Figs. 1, 6, 14 and 15, the overdrive casing 48 is formed with a longitudinally extending boss 90 having a cylindrical bore 91 slidably receiving a plunger rod 92 on the rear end of which is mounted an inwardly extending shift fork 93 which extends within the annular groove 62 of the shiftable sleeve 59. The plunger rod 92 extends forwardly through the aforesaid walls 45 and 47 and also through the intermediate member 49 and has its forward end portion reduced in diameter at 94 to form a shoulder 95 for locating an inwardly extending shift member 96 which projects inwardly of the main transmission casing 43 at the rear of the shiftable gear 39 and so arranged that when this gear is shifted rearwardly to mesh with the reverse idler gear 35, the shiftable member 96 will be moved rearwardly sufficient to operate the plunger rod 92 for effecting reverse lock-out of the overrunning clutch teeth of engaging teeth 63 with the clutch teeth 64. Fixed to the intermediate member 49 is a guide pin 97 which projects forwardly through an opening 98 in the shift member 96 for guiding the shifting movement of the member 96.

As best shown in Fig. 15 the rear end portion 99 of the plunger rod 92 has its inner face flattened at 100 for receiving the hub portion 101 of the shiftable fork 93 and for fixing this fork on the rod portion 99. In a similar manner the forward reduced end portion 94 of the plunger rod 92 is flattened as indicated at 102 to receive and secure the hub portion 103 of the shiftable member 96.

The plunger rod 92 has a forwardly open bore 104 slidably receiving a rod 105, the rear end of this rod having an abutment 106 for taking the end thrust of a preloaded coil spring 107 which surrounds rod 105 within the bore 104. The forward end of coil spring 107 acts against an annular washer 108 which is held rearwardly against the forward end of the plunger rod portion 94 by a nut 109 threadedly engaging rod portion 94 and also serving to hold the shift member 96 against the aforesaid shoulder 95.

The rod 105 has a forward enlarged portion 110 forming a shoulder 111 which engages the forward face of the washer 108, the rod portion 110 extending through the nut 109 and into the bore 112 formed in the boss 113 of the main transmission casing 43. The rod portion 110 is formed with a pair of longitudinally spaced detents 114 and 115 selectively engaged by a ball 116 yieldingly urged toward the rod portion 110 by a spring 117 reacting against an abutment 118. The detents 114 and 115 yieldingly hold the rod 105 in positions respectively corresponding to the Fig. 5 position of the shiftable clutch member 59 and to the other position of this shift member when the latter is moved rearwardly to engage clutch teeth 63 thereof with the driving shaft clutch teeth 64.

Secured to the rod portion 110 by reason of the pin 119, we have provided a shift collar 120 having a downwardly opening slot 121 receiving a pin 122 projecting from the lever 123 carried by a rock shaft 124 which extends outwardly through the boss 125 for connection with an operating lever 126.

Operably connected to the downwardly extending end of lever 126 is one end of a Bowden wire mechanism 127 which, as best seen in Fig. 1, extends to some convenient point of manipulation by the vehicle driver. In our present illustration we have arranged the forward end of the Bowden wire mechanism for operation by a handle or knob 128 at the usual vehicle dash 129 which carries the fixture 130 for mounting the driver operated end of the Bowden wire mechanism and the handle 128.

With the parts positioned as illustrated in the drawings, let it be assumed that the driver manipulates the gear shift lever 28 to slide the main transmission gear 39 into mesh with the reverse idler gear 35 for driving the vehicle in reverse. This shifting movement of gear 39 will engage the gear with the shift member 96 during the latter part of the gear shifting movement, the shift member 96 being thereby shifted rearwardly to operate through plunger rod 92 and shift fork 93 to move the shiftable clutch member 59 sufficiently to engage clutch teeth 63 with the clutch teeth 64 and thereby establish a two-way direct drive between the driving shaft 36 and the driven shaft 25 in order to accommodate the reverse drive.

When the plunger rod 92 is shifted rearwardly in response to rearward shifting of the gear 39, the ball 116 maintains the Fig. 15 engagement with the detent 115 so that the rod 105 is held, spring 107 being further compressed inasmuch as the nut 109 moves rearwardly with the plunger rod to cause the washer 108 to further load the coil spring 107. When the gear shift lever 28 is manipulated to move the gear 39 forwardly out-of-mesh with the reverse idler gear 35, the spring 107 will cause the shiftable sleeve 59 to be restored to the Fig. 6 position, thereby likewise restoring the shiftable member 96 to the Fig. 6 position until the washer 108 strikes the shoulder 111 to limit the forward movement of these parts under the action of the spring 107.

Our arrangement is such that when the handle 128 is pulled rearwardly or toward the vehicle driver to shift the sleeve 59 rearwardly independently of gear 39, the sleeve 59 is shifted without resistance from the spring 107. Thus when the handle 128 is pulled rearwardly, lever 126 operates through the rock shaft 124 to cause the pin 122 to act on the collar 120 and thereby move the rod portion 110 rearwardly, causing the shoulder 111 to act through the washer 108 to transmit a direct rearward thrust on the plunger rod 92 for moving the latter to shift the sleeve 59 rearwardly. At such time the ball 116 will engage the forward detent 114 and when the handle 128 is restored to the Fig. 1 position, the accompanying forward movement of the rod 105 will act through the preloaded spring 107 to cause the plunger rod 92 to follow the forward movement of rod 105 in restoring the parts to the positions thereof illustrated in the drawings. It will thus be apparent that the clutch member 59 is shifted by a plurality of driver operated control means respectively at the handle 128 and by the manipulation of the gear shift lever 28 acting through the main transmission gear 39.

We will now describe our secondary controlling means and lubricating system for the overdriving mechanism, it being preferred to utilize the lubricating medium at the overdriving mechanism A and the main transmission B as the fluid medium for effecting the operation of the secondary control means. While our system combines the secondary control for the overdriving mechanism and the lubricating system, with advantages of simplification and improved operation in general, we desire to point out that in the broader aspects of our invention the lubricating system may be separated from the secondary control means in which event other fluid media may be employed.

As best shown in Fig. 5, the casing 48 of the overdriving mechanism A provides a reservoir or sump 135 for storing lubricating oil which may be drained by removal of a plug 136, a corresponding drain plug 137 being provided for the reservoir 44 of the main transmission B. We have provided a novel system of locating and driving a pumping means for placing the lubricating oil under pressure for delivery to the parts to be lubricated as well as for delivery of the pressure fluid for control of the overdriving mechanism, the lubricating oil preferably being circulated between the overdriving mechanism A and the main transmission B.

The reservoirs 44 and 135 are in continuous communication with each other through the arcuate passages 138 which extend rearwardly through the main transmission rear wall 45 for communicating with the reservoir 135 of the overdriving mechanism. As will presently be more apparent, the lubricating oil delivered by the pumping means is constantly delivered back to the main transmission B and in this manner the lubricating oil is circulated and the main transmission used as a cooling reservoir for the lubricating oil which becomes heated during operation of the overdriving mechanism.

The casing 48 has a rear transverse wall structure 139 for receiving the pumping means G and for carrying a bearing 140 for rotatably supporting the driven shaft 25. A pump driving sleeve 141 is keyed at 142 to the driven shaft 25, this key also serving to drive the speedometer driving gear 143 in mesh with the usual speedometer operating driven gear 144. A plate 145 is secured by fasteners 146 to the rear wall structure 139 and the latter structure is formed with a shouldered counter-bore 147 for receiving the pump G.

Figure 7:
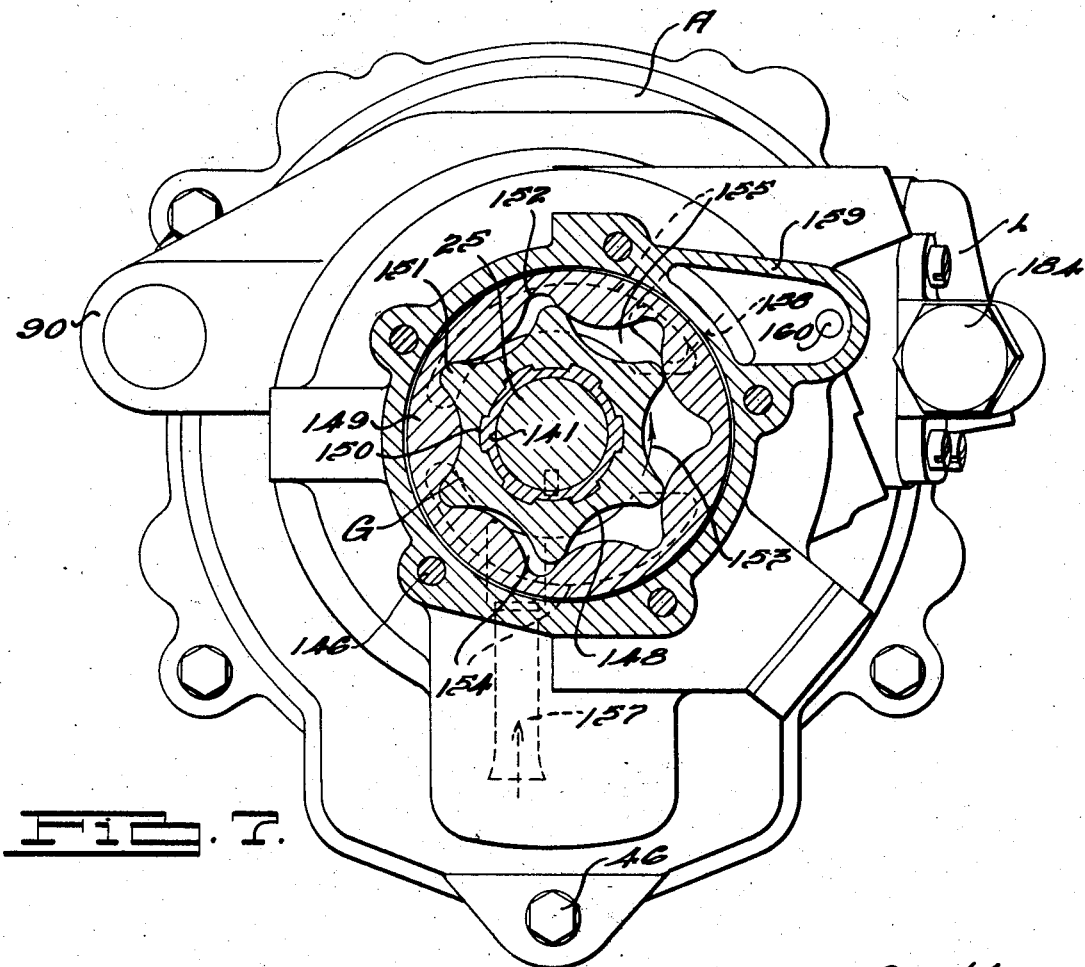
Fig. 7 is a sectional elevational view taken as indicated by the line 7—7 of Fig. 5 and illustrating the pump for the overdrive pressure fluid system.

The pump G, as best shown in Figs. 5 and 7, comprises driving and driven members 148 and 149 relatively eccentrically disposed. The driving member 148 is secured by splines 150 to the driving sleeve 141 and is formed with a plurality of projections 151. The driven member 149 is disposed eccentrically with respect to shaft 25 and driving member 148 and is rotatable within the counter-bore 147, the member 145 serving to locate the pumping members and form a housing therefor in conjunction with the rear wall structure 139. The driven member 149 has a plurality of recesses 152 one more in number than the number of projections 151 and adapted for driving engagement with these projections as best illustrated in Fig. 7.

With the pump driving member 148 rotating in the normal forwardly driving direction indicated by arrow 153 in Fig. 7, it will be apparent that the pump will provide for a suction or inlet at 154 and a pressure fluid delivery at 155, the suction and delivery constantly acting during operation of the pump G.

Figures 8, 9, 10:
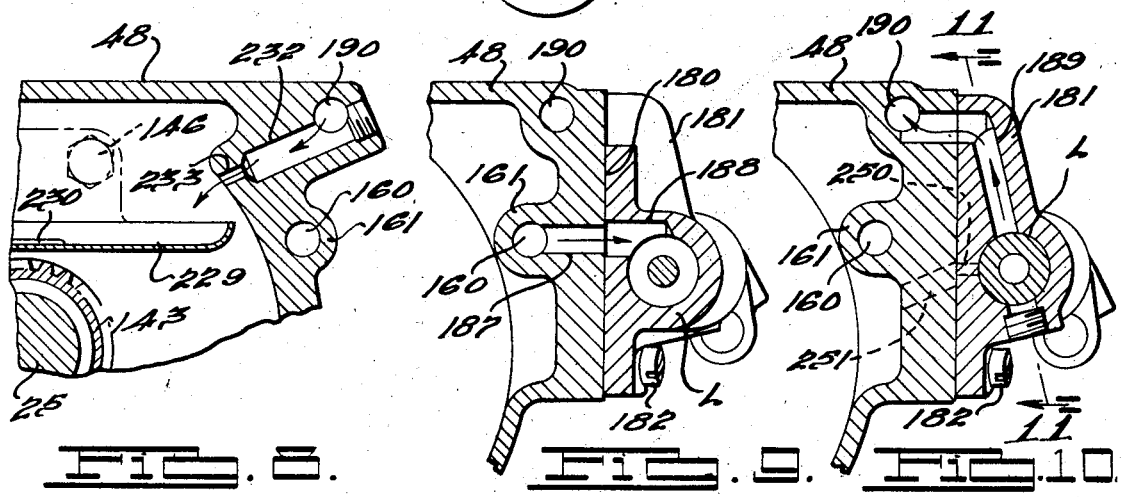
Fig. 8 is a detail sectional elevational view taken as indicated by the line 8—8 of Fig. 6 illustrating a portion of the overdrive lubricating system for supplying lubricant to the overrunning clutch and other parts of the overdrive mechanism associated therewith.
Fig. 9 is a detail sectional view taken as indicated by the line 9—9 of Fig. 6 illustrating the pressure fluid supply to the valving means of the secondary or kick-down control for the overdrive.
Fig. 10 is a detail sectional view taken as indicated by the line 10—10 of Fig. 6 illustrating the pressure fluid overflow from the valving means for distribution as a lubricant to the overdrive mechanism.

The plate member 145 is provided with an intake passage 156 formed with a downwardly extending intake pipe 157 for withdrawing the lubricating oil from the reservoir 135 for passage to the pump intake 154 and for delivery under pressure at the outlet 155 which, as best illustrated in Figs. 6 and 7, passes through a return-bend delivery passage 158 formed in the plate member 145. The pressure fluid then passes outwardly in a passage 159 formed in the end wall structure 139 for delivery forwardly through the high pressure passage 160 which is formed in a boss 161 of the overdrive casing 48 (see also Figs. 8, 9 and 10).

The pressure fluid delivered forwardly in passage 160 is conducted to an annular member 162 which is secured by fasteners 163 to the aforesaid boss 90 so as to form therewith a forwardly opening cylinder 164 of the pressure fluid operated motor H. This motor includes an annular piston 165 slidable in the cylinder 164 and provided with an annular expansible sealing assembly 166 on which the pressure fluid operates in forcing the piston 165 in the forward direction.

The aforesaid sun gear 71 has a forwardly extending splined portion 167 for driving connection with the spider portion 168 of a brake drum 169 which is externally splined at 170 for engagement with the frictional braking elements 171. The casing 48 is formed with the internal splines 172 engaged by the stationary but axially slidable annular plates 173 and 174 respectively carrying the annular mats of friction material 175 and 176, a further friction mat 177 being secured to the intermediate member 49. When the pressure fluid is delivered from the pump G through the passage 160 to the cylinder 164, the piston 165 is forced forwardly to pack the various friction mats so as to brake the drum 169 and thereby prevent rotation of the sun gear 71. Inasmuch as the pump G is operating to deliver pressure fluid whenever the motor vehicle is driven in the normal forward direction, it follows that under such conditions pressure fluid will be delivered to operate the motor H to engage the braking means, generally designated at J, for holding the sun gear 71 stationary and thereby provide for the necessary reaction for the operation of the planetary overdrive. However, as will presently be apparent, we have provided driver-controlled secondary means for the over-driving mechanism whereby the sun gear may be released for rotation to thereby release the overdrive and effect a change in the speed ratio drive through a slower drive in the mechanism A.

The annular plate 173 is provided at suitable points with outward extensions 178 yieldingly urged rearwardly by the coil springs 179, one of these springs and plate projections being illustrated in Fig. 5. Thus, when the pressure fluid is released at the cylinder 164 the springs 179 will move the piston 165 rearwardly and serve to quickly release the elements of the braking means J.

The casing 48 at the right-hand or far side of the mechanism A as viewed in Fig. 1, is provided with a machined face 180 to which is secured the casting 181 by suitable fasteners 182, this casting being adapted to carry a valving means generally designated at L for controlling the pressure fluid supply from the pump G to the motor H. As best seen in Figs. 6, 9, 10, 11 and 12, the casting 181 is formed with a cylindrical bore 183 closed at the rear by a plug 184 and at the forward end by a plate 185 through which a Bowden wire 186 is adapted to slidably operate. The casing 48 is provided with a passage 187 which extends outwardly from the pressure fluid supply passage 160 to the passage 188 of the casting 181 for conducting the pressure fluid to the bore 183. The casting has an overflow or relief passage 189 spaced forwardly from the supply passage 188 and adapted to communicate with the bore 183 and also with a longitudinally extending overflow passage 190 which extends parallel to the supply passage 160 but above the latter passage in the casing 48.

A piston valve member 191 is slidably disposed in the bore 183 and has a rear projection 192 adapted to engage the closure plug 184 to limit rearward movement of the valve 191 at a point where the supply passage 188 will admit pressure fluid to the bore 183 for urging the valve member 191 forwardly from the position illustrated in Fig. 11 to the position illustrated in Fig. 12.

A relatively heavy coil spring 193 acts between the front closure plate 185 and the valve member 191 to yieldingly urge the valve member rearwardly or in opposition to the movement of the valve member in response to the pressure fluid acting thereon. The value of the spring 193 is such, in its relationship with the pressure fluid delivery of the pump G, that when the pressure fluid is admitted through the supply passage 188 the valve member 191 will be moved forwardly against the spring 193 to a position generally similar to that shown in Fig. 12 wherein the overflow passage 189 is only partially open to the bore 183. Therefore, a pressure of the fluid in the supply passage 160 is maintained sufficient to cause the motor H to operate the braking means J, the pump G nevertheless delivering an excess quantity of lubricating oil so that there is a constant flow of the oil from the bore 183 to the overflow passages 189 and 190. We have provided a driver-operable means for further moving the valve member 191 forwardly to entirely uncover the overflow passage 189 so that at such time the pressure of the oil in the supply passage 160 will drop to release the braking means J and allow the sun gear 71 to rotate freely.

The valve member 191 is formed with an axial bore 194 slidably receiving a cylindrical piston operator 195 adapted, in response to forward pull of the Bowden wire 186, to contact with a closure plug 196 for the bore 194 and thereby cause the Bowden wire 186 to pick-up the valve member 191 and move the latter forwardly to entirely uncover the overflow passage 189 at which time the extension 197 of plug 196 will strike against a member 198 which is fixed to the front plate 185, this member 198 slidably guiding the Bowden wire 186. It will be apparent that the cylindrical piston 195 has a lost motion connection with the plug 196 such that when the valve member 191 is in the normal Fig. 12 position, the Bowden wire 186 when pulled forwardly does not immediately operate to move the piston member 191 forwardly from the Fig. 12 position and in this manner any accidental or incomplete movement of the Bowden wire will not disturb the valve member to only partially release the braking means J. On the other hand, the Bowden wire mechanism 186 must be pulled through most of its operative movement during the kick-down operation so that toward the end of this Bowden wire movement, the valve member 191 will be picked up and quickly moved forwardly to effect release of the braking means J.

The Bowden wire 186 is adapted for operation by the vehicle driver, the arrangement preferably comprising a connection to the throttle adjusting accelerator pedal, and so arranged that the Bowden wire will be operated in response to an overtravel of the accelerator pedal beyond the pedal position corresponding to wide-open engine throttle.

Referring now to Figs. 1 and 4, the engine C is provided with the usual intake manifold 199 for conducting the usual gasoline and air mixture from a carburetor 200 through the riser 201 under control of a butterfly valve 202 adjustable by a lever 203 so that when the throttle valve is in its wide-open position, the lever 203 will engage a stop pin 204 to prevent further throttle opening movement of the lever 203. Pivotally connected to the lower end of lever 203 by a suitable pivot pin 205 is a bracket 206 having a bore 207 slidably accommodating the forward end of a throttle-operating rod 208. This rod carries a collar 209 fixed thereto, a spring 210 acting between the bracket 206 and collar 209 to yieldingly urge separation of the bracket and rod. A frame member 211 is adapted to limit this separating movement, the frame member having a forward end portion 212 for connection with the bracket 206, the rear end of the frame 211 being flanged at 213 to provide an abutment for the collar 209, the rod 208 being slidable through the flange 213. The spring 210 is such that the rod 208 operates the bracket 206 without relative movement therebetween in adjusting the throttle valve 202 throughout the range of its movement between the closed or engine idling position and the wide-open throttle position. At the same time, the spring 210 will accommodate forward overtravelling movement of rod 208 so that when the lever 203 is moved against the stop pin 204, further forward movement of rod 208 will further compress the spring 210 while the bracket 206 is held against such further forward movement.

The usual vehicle toe board 214 has a pivotal mounting 215 for the accelerator pedal 216 yieldingly urged to the throttle closing position by a spring 217. A suitable linkage mechanism is provided between the accelerator pedal 216, rod 208, and Bowden wire 186 so that movement of the accelerator pedal 216 is accommodated through two ranges of movements. The first range of depressing movement of the accelerator pedal serves in a conventional manner to open the throttle valve 202, the second range of accelerator pedal movement taking place after the throttle valve has been moved to its wide-open position. Further depression of the accelerator pedal will then pull the Bowden wire 186 to effect the aforesaid kick-down operation on the valve member 191 to release the braking means J.

Pivotally mounted to the under side of the toe board 214 we have provided a system of independently operable levers 218 and 219, the latter lever being operably connected to a lever 220 having a laterally projecting finger portion 221 disposed in the path of forward swinging movement of the lever 218, the levers 219 and 220 moving together as a unit. In the arrangement as viewed in Fig. 1, levers 218 and 220 are on the near side of the vehicle while lever 219 is on the far side. A cross rock shaft 219' connects levers 219 and 220 as a unitary operating structure since these levers are fixed to the rock shaft while lever 218 is loose on the rock shaft. Articulated between the accelerator pedal and rods 208 we have provided a connecting link 222, the lever 218 being also pivotally connected to this link and rod at 223. A tension spring 224 serves to yieldingly maintain the lever 219 in the Fig. 1 position and this spring may be relatively light because it is called on only to return the Bowden wire 186 and parts connected thereto to their original positions after the accelerator pedal has been released from their kick-down operation, it being noted that the relatively heavy spring 193 will operate to restore the valve member 191 to the Fig. 12 position subsequent to the kick-down operation.

When the accelerator pedal 216 has been moved throughout its first or throttle valve opening range of movement, the lever 218 at the time of wide-open throttle position engages finger 221 so that further depression of the accelerator pedal will then cause the lever 218 to pick-up the levers 220 and 219 for operation of the Bowden wire 186 for the kick-down operation of the valve member 191. During the second range of movement of the accelerator pedal 216 for the kick-down operation, the accelerator pedal will receive a further load in compressing the spring 210 and to a lesser extent by further placing the spring 224 under tension so that in this manner the operator will be advised of the accelerator pedal position during the wide-open throttle movement and thereby guard against accidental movement of the accelerator pedal for the kick-down operation. This additional load may, of course, be made as great as may be desired. A stop pin 225 serves to limit the return movement of the lever 219 and parts connected thereto under the action of the tension spring 224 when the accelerator pedal 216 is released by the vehicle driver from the kick-down operation.

We have therefore provided a secondary controlling means for the overdriving mechanism in the nature of a kick-down control whereby the vehicle driver may at any time release the braking means J to render the overdrive ineffective, it being apparent that after the kick-down operation the overdrive is immediately restored upon partial release of the accelerator pedal. According to the present embodiment of our invention, the overdrive does not take place until the primary controlling means in the form of the aforesaid automatic clutch F has operated while the braking means J is in its normal position of operation. After the overdriving mechanism has thus been brought into operation, it will be apparent that operation of the kick-down mechanism to release the sun gear 71 will not ordinarily cause the automatic clutch F to brake the drive connection between the internal gear 70 and the driven shaft 21 because these parts are still rotated at the speed of the driven shaft so as to normally maintain the pawls 76 in their outwardly extended or clutching position. However, if during the kick-down operation the vehicle nevertheless slows down during this wide-open throttle condition then, in such event, the pawls 76 will of course be moved inwardly to their declutching positions by the springs 79 and the driving shaft 36 will immediately speed up by the amount of the planetary gearing ratio of the overdrive to bring the overrunning clutch E into operation to drivingly connect shaft 36 with the driven shaft 25 for a one-way direct drive just as in the case where the automatic clutch F disengages at times other than during the operation of the kick-down mechanism which, of course, would be rather unusual.

The lubricating oil which is passed to the overflow passage 190 whenever the pump G is operating to supply pressure fluid is utilized to lubricate parts of the overdriving mechanism A and also for maintaining a circulation of the lubricating oil between the overdriving mechanism and the main transmission B. When the accelerator pedal 216 is operated for the kick-down operation to thereby cause the valve member 191 to completely uncover the overflow passage 189, then of course, there will be a further supply of oil to the overflow passage 190 but this merely takes the form of an additional quantity of oil which is nevertheless readily accommodated in the lubricating and circulating system without building up a back pressure sufficient to effect operation of the braking means J which is vented at passage 190 during the kick-down.

Referring now to Figs. 5, 6, 8 and 13, we have illustrated a novel means for supplying lubricating oil from the overflow passage 190 to the operating parts of the overrunning clutch E and forwardly therefrom to the shiftable clutch member 69 and the automatic clutch F. The forward extension of the driven shaft 25 is provided with a plurality of oil passages 226 which open forwardly toward the overrunning clutch rollers 55, the rear end of passages 226 having associated therewith an annular lubricant deflector 227 carried by the cylindrical extension 57 and arranged to direct lubricating oil into the passages 226, the lubricating oil flowing outwardly of the driven shaft spider portion 228 by the effect of centrifugal force which acts to throw the lubricating oil outwardly along the rear face of the spider portion 228. Extending transversely of shaft 25 we have provided a lubricant trough 229 carried by the aforesaid fasteners 146, this trough having an outlet 230 for directing the oil by gravity toward the opening 231 of the deflector 227. In order to supply the trough 229 with lubricant circulated from the pump G, the overflow passage 190 is provided with an inwardly and downwardly extending branch passage 232 terminating in a restricted outlet 233 for supplying the desired amount of lubricant into the trough 229. It will be apparent that the lubricant in the overflow passage 190 will be directed through the outlet 233 and into the trough 229 whence the oil will flow through the outlet 230 for passage into the opening 231 of the deflector 227, the oil traveling by centrifugal force upwardly and outwardly of the shaft portion 228 where the oil will be forced forwardly through the passages 226 for lubricating the overrunning clutch G from whence the oil will pass outwardly through the passageway 234 and thence rearwardly of the splines 61 and also forwardly for lubricating the parts of the automatic clutch F.

At the forward end of the overflow passage 190, the lubricant passes through an opening 235 in the intermediate member 49 and thence inwardly at 236 to the space 237 provided by the intermediate member and a sheet metal annular member 238.

The passage 235 is in part formed by the flange 239 of the main transmission casing 43 as best seen in Fig. 6, this flange having a passage 240 therethrough for conducting a portion of the lubricant from the overflow passage 190 forwardly into the main transmission B where the lubricant finds its way to the reservoir 44. The casing 43 is formed with a deflected portion 241 adjacent passage 240 to accommodate the flow of oil from this passage into the main transmission.

The oil which is conducted inwardly of the passage 236 is delivered at the outlet 242 whence a certain amount of the oil passes inwardly through openings 243 in the sun gear extension 167, this oil being fed rearwardly through the sun gear 71 by the oil feed threads 244 formed around the shaft extension 51 for passage of the oil to the forward ends of splines 52 whence the oil feeds outwardly along the rear end of the planet carrier hub 65 to the meshing teeth of sun gear 71 and planet pinions 68. Other portions of the lubricant from the outlet at 242 pass rearwardly along the forwardly extended teeth of the sun gear 71 and thence outwardly and to the rear of an annular oil deflector 245 whence the oil feeds rearwardly through the hollow bores 246 of the planet pinion shafts 67. This oil flows through the shaft outlets 247 to lubricate the shaft bearings 69 and also rearwardly through the outlet 248 at the rear end of shafts 67 for conducting the oil through cage passages 249 for lubricating the working parts of the automatic clutch F.

It will therefore be apparent from the foregoing that whenever the pump G is operating to supply oil to the pressure fluid passage 160, the oil is also delivered to the overflow passage 190 for distribution to the various aforesaid parts of the overdriving mechanism, the oil being supplied for lubricating purposes when the valve member 191 is in its normal Fig. 12 position, as well as when this valve member is operated by the accelerator pedal 216 for the kick-down operation in releasing the braking means J.

Any oil which may escape forwardly past the valve member 191 and into that portion of the cylindrical bore 183 which contains the coil spring 193 is drained inwardly of the casting 181 through a drain passage 250 (see Figs. 6, 11 and 10) whence this oil flows through a communicating passage 251 through the casing 48 for return to the reservoir 135.

If desired the automatic clutch F may be set to engage at a very low motor vehicle speed so that the overdrive will operate for city driving. Rapid acceleration of the vehicle is always present by the natural action of a full depression of the accelerator pedal. Such arrangement provides for low fuel consumption and high overall operating efficiency.

Referring now to Figs. 16–25 we have illustrated a somewhat modified form of secondary valving means and control therefor adapted to be substituted for the aforesaid valving means L in the preceding embodiment with only a few minor changes to the aforesaid casing 48 of the overdrive mechanism A, such changes being limited, for the most part, to certain of the fluid conducting passages adjacent the secondary valving means. In Fig. 25 we have illustrated a slightly different accelerator pedal control although, if desired, the Fig. 1 arrangement may be used. In Fig. 25 the overdrive is not restored, in releasing the accelerator pedal from kick-down, until the accelerator pedal is definitely moved to a predetermined position of throttle closing, preferably about fully closed throttle when the accelerator pedal is fully released.

In our modification we have provided a kick-down valving means which is adapted to close off communication between the pump G and the cylinder 164 and at the same time this cylinder is vented to the interior of the overdrive casing so as to effect a very rapid release of the braking means J when the accelerator pedal 216 is operated for the kick-down operation. Our modification also provides for a very quickly operating adjustment of the secondary valving means in response to the kick-down movement of the accelerator pedal and also a very quick release thereof from the kick-down position, our arrangement provided for a snap-action control on the valving means.

In our modification the overdriving mechanism A' is identical with the aforesaid mechanism A insofar as the working parts and their functions are concerned, but in the modification the pressure fluid from the pump G is conducted from the aforesaid passage 159 and into the same forwardly extending longitudinal supply passage 160 which in this instance is divided into two separate portions by a fixed cylindrical plug 255, the forward portion of the passage thereby formed being designated as 256 for conducting the pressure fluid to the braking means J as before described. In place of the aforesaid valving means L we have now substituted a casting 257 secured to the overdrive casing 48' by fasteners 258 which will fit in the same positions occupied by the aforesaid fasteners 182 for the casting 131 in the preceding embodiment.

The casting 257 is formed with a cylinder 259 having a cylindrical bore 260 within which is pressed a fixed sleeve 261 which in turn is provided with a cylindrical bore 262 slidably receiving the valving member 263. The rear end of the bore 260 is closed by a plug 264 and the valve member 263 has a head 265 which engages this plug to limit the rearward movement of the valve member when in the normal Fig. 18 position before the kick-down operation.

Any oil which escapes rearwardly into the space 266 is drained by the communicating passages 267 and 268 which establish constant communication between the chamber 266 and the interior of the casing 48' whereby any oil drained inwardly of the passage 268 finds its way downwardly to the aforesaid reservoir 135. The pressure fluid conducted forwardly in the supply passage 160 is conducted outwardly at the plug 255 through the casing passage 269 and into the communicating inlet passage 270 of cylinder 259 whereby the pressure fluid passes forwardly through the longitudinally extending arcuate sleeve passage 271 for outlet into the upwardly extending passage 272 which is closed off at the top by a plug 273 but which opens inwardly by a branch passage 274 for causing the pressure fluid to act on a plunger valve 275. This plunger valve is urged outwardly by a coil spring 276 to insure a back pressure on the pressure fluid in passages 160 and 256 sufficient to operate the braking means J, the pump G being of sufficient capacity to move the plunger valve 275 inwardly to constantly conduct a portion of the pressure fluid into the passage 277 which is open to the aforesaid longitudinally extending overflow passage 190 which is identical to the corresponding passage in the first mentioned embodiment of our invention. The lubricating oil conducted into the passage 190 therefore is distributed for lubricating purposes and for circulation with the main transmission B just as previously described.

Returning now to the description of the pressure fluid entering the sleeve passage 271 from the inlet passage 270, the sleeve 261 has a port 278 which, with the valve 263 positioned as in Fig. 18, admits fluid from the inlet passage 270 to the interior of the sleeve 261 surrounding the reduced portion 279 of the valve 263. The oil entering the sleeve interior designated as 280 flows forwardly and then downwardly through the sleeve port 281 and communicating passage 282 for delivery inwardly by the plate passage 283 thence upwardly in passage 284 of the plate 257 to a communicating passage 285 of the casing 48', the latter passage opening into the passage portion 256 forwardly of the aforesaid plug 255 for operating the braking means J.

Any oil which tends to collect forwardly of the sleeve 261 is drained back to the reservoir by the system of communicating drain passages 286 and 287 which respectively extend through the casting 257 and the casing 48'.

When the valve member 263 is operated for the kick-down operation so as to move the valve member forwardly from the Fig. 18 position to the Fig. 19 position, the valving means is so arranged that the passage 256 is drained back to the reservoir 134 by the system of drain passages 288 and 289 respectively formed in the casting 257 and the casing 48'. The drain passage 288 communicates inwardly to the arcuate sleeve passage 290 and the communicating sleeve port 291, the latter being closed by the forward head portion 292 of the valve member 263 when the latter is in the Fig. 18 position but which is adapted to be uncovered as in the Fig. 19 position, in which case the oil flows from passage 256 through the passage 285 thence downwardly through passage 284 and then outwardly at 283, through the sleeve passage 282 and port 281 to the sleeve face 280 thence forwardly through the sleeve port 290 and passage 291 and then inwardly through the drain passages 288 and 289. During this draining operation it will be noted from Fig. 19 that the head 265 has been moved to cover the sleeve port 278 to cut off the supply of pressure fluid to the sleeve chamber 280. It will therefore be apparent that when the valve member 263 is positioned as in Fig. 18, the pressure fluid from the pump will be supplied to operate the valving means J, just as in the preceding embodiment, but that when the valve member 263 is moved forwardly by the kick-down operation of the accelerator pedal 216, the valve member being in the Fig. 19 position cuts off the supply of pressure fluid to the valving means J' and the fluid from the cylinder 164 is at the same time opened to the reservoir 135 to effect a very rapid release of the braking means J. When the accelerator pedal is released from the overdrive kick-down operation and has reached the predetermined desired position of throttle closing for delayed restoration of overdrive, then the valve member 263 is restored by reason of the aforesaid spring 210 and a snap-action mechanism hereinafter described so that the valve member is moved to the Fig. 18 position to restore the communication of the pressure fluid to the cylinder 164 for operating the braking means J. There is a constant supply of the lubricant from the pump to the overflow passage 190 because in each position of the valve member 263 the sleeve passage 271 constantly establishes communication between supply passage 270 and outlet passage 272.

In order to operate the valving member 263 with a quick snap-action movement toward the latter part of the depression of the accelerator pedal 216 viz., toward the latter part of the kick-down movement of the accelerator pedal, and then to restore the valving member 263 with delayed action viz., when the accelerator pedal is released to a throttle closing position, we have provided a mechanism generally indicated at O within a housing structure 295 secured to the forward end of the casting 257 by the fasteners 296, this mechanism operating in conjunction with the Fig. 25 accelerator pedal hook-up substituted for the Fig. 1 arrangement. The aforesaid Bowden wire 186 in this instance has its rear end fixed to a rod 297 which extends rearwardly through an opening 298 of the housing 295 and which carries adjacent its rear end a transverse pin 299 pivotally engaging a swinging stirrup 300. At its upper end this stirrup receives a pivot pin 301 carried by the lower end of a swinging lever 302 fulcrumed for swinging lost motion by a pin 303 fixed transversely across the port forwardly projecting end 304 of a plunger 305. The lever 302 has an opening 306 through which the pin 303 passes, this opening providing considerable clearance in the direction of swing of lever 302 so as to establish a lost motion movement between the lever and the plunger 305.

At the upper end of lever 302 there is mounted a transverse shaft 307 supporting a pair of weights 308, and at each end of shaft 307 there is anchored the upper end of a coil spring 309 the lower end of which is connected to an ear 310 of a second stirrup 311 welded or otherwise fixed to the aforesaid stirrup 300.

The plunger 305 has a rearwardly extending stem 312 which passes through the housing 295 and is connected at 313 with the valve member 263, an adjustable abutment 314 and associated locking member 315 therefor being adapted to strike against the housing 295 to limit the forward movement of the valve member 263 when operated for the kick-down release of the overdriving mechanism. In order to seal the opening 298 against the entry of dust and other foreign particles, we have provided a flexible sealing member or boot 316 the inner end of which moves back and forth with the movement of rod 297.

In Fig. 25, certain changes have been made over the Fig. 1 control of the Bowden wire 186. In Fig. 25 the rock shaft 219' is positively operated in opposite directions by the accelerator pedal 216. To this end, in addition to lever 219 fixed to rock shaft 219', there is a sector 220ª fixed to this rock shaft and having an arcuate slot 220ᵇ. The loosely mounted lever 218 now carries a pin 220ᶜ slidable in slot 220ᵇ and providing a lost motion connection between pedal 216 and sector 220ª. In Fig. 25 pedal 216 is fully released for closed engine throttle or engine idling and when pedal 216 is depressed throughout its first range of movement in providing wide open engine throttle, pin 220ᶜ moves in slot 220ᵇ to the forward end thereof without causing any movement of sector 220ª. However, on further depression of pedal 216 for the kick-down operation, throttle valve 202 remains fully open as before and spring 210 accommodates this further depression of pedal 216 which then swings segment 220ª and lever 219 as a unit in effecting the kick-down operation of the valving means.

When pedal 216 is released from its full depression sector 220ª does not at first return since pin 220ᶜ slides in slot 220ᵇ until it strikes the rear end of the slot corresponding to nearly closed engine throttle. Then spring 217 further restores pedal 216, when released by the operator, to restore segment 220ª to the Fig. 25 position to again supply oil pressure to the braking means J. Of course, by changing the length of slot 220ᵇ, with appropriate lost motion connections at the valving means, the braking means may be restored at any desired point of accelerator release during throttle closing or the Fig. 1 arrangement may be employed.

With the parts positioned as illustrated in Figs. 18 and 25, let it be assumed that the overdriving mechanism is in operation and that the vehicle driver desired to release the overdrive for the kick-down operation to a lower speed ratio drive which, as aforesaid, is provided by the direct drive from driving shaft 36 to the driven shaft 25 through the overrunning clutch E. As before, the driver depresses the accelerator pedal 216 beyond its wide open throttle position and through the overtravel movement in compressing the spring 202. This overtravel picks up sector 220ª and lever 219 and thereby pulls through the Bowden wire 186 to move the rod 297 forwardly, causing the pin 299 to swing the inner stirrup 300 about the pivot pin 301 until the axes of the springs 309 are swung forwardly of the plane containing the axes of the pivot pin 301 and the shaft 307 at which time the pin 299 occupies the dotted line position 299'. This causes the springs 309 to come into action to swing the lever 302 forwardly about the pin 301 until the rear end of the lever opening 306 engages the pin 303. At the time of this engagement, the lever 302 has considerable momentum by reason of the weights 308 and the lever 302 is then quickly moved forwardly to cause the plunger 305 to adjust the valve 263 from the Fig. 18 position to the Fig. 19 position for effecting the release of the braking means J.

The snap action mechanism O operates similarly when the accelerator pedal 216 is released from the overtravel movement, but with delayed action, the spring 217 swinging lever 218 so that pin 220ᶜ picks up sector 220ª for exerting thrust through the Bowden wire 186 to move the pin 299 from the dotted line position 299' thereof to the position illustrated in Fig. 18 so that toward the end of this movement of the rod 297, and just before pedal 216 is fully released, the springs 309 are again thrown over the center position and the lever 302 is swung rearwardly to take up the lost motion provided by the lever opening 306 and then to quickly adjust the valve member 263 from the Fig. 19 position to the Fig. 18 position in restoring the operation of the braking means J. Thus, once valve member 263 is moved for kick-down, it is not restored until pedal 216 is released to its first range of depressed travel and preferably not until pedal 216 is fully released. This eliminates a number of operations of the braking means J as might occur undesirably by minor pedal movements between the limits of the kick-down range and also insures using the engine as a brake, without free-wheeling, upon approximately full release of the accelerator pedal after kick-down to restore the operation of brake J provided of course that the automatic clutch F has not released by slowing down the vehicle sufficiently to allow springs 79 to release pawls 76.

We have, in Figs. 16 to 25, provided a lost motion connection at 220ᵇ and 220ᶜ between pedal 216 and Bowden wire 186; another lost motion connection as in Fig. 4 between pedal 216 and the engine throttle valve 202; and a further lost motion connection at the snap-action mechanism O between the leading Bowden wire 186 and the follower lever 302; the additional lost motion at slot 306 utilizing the momentum of weights 308 to assist the snap-action of movement of valve member 263.

Referring to Fig. 26 we have illustrated a modified type of operating means between the kick-down Bowden wire operation of Fig. 25 and the valve member which is adapted to be operated thereby, in Fig. 26 arrangement being adapted for use with the aforesaid valve member 263 and in place of the snap-action mechanism O illustrated in Fig. 18.

In Fig. 26 the casting 257' is identical to the aforesaid casting 257 except that it is now formed with a forward extension 320 having a cylindrical bore 321 accommodating sliding movement of a forward extension 322 of the valve member 263', the latter being otherwise similar to the aforesaid valve 263.

The casting extension 320 is formed with a boss 323 for housing a spring 324 acting on a ball 325 selectively engageable wit a pair of detents 326 and 327 formed in the valve extension 322 when the valve member 263' is in the normal Fig. 26 position and when the accelerator pedal is operated for the kick-down adjustment of the valve member. The valve extension 322 has an axial bore 328 slidably receiving a plunger 329 fixed to the rear end of the Bowden wire 186 which slidably enters the casting extension 320 at the forward closure member 330.

A pair of springs 331 and 332 are disposed within the bore 328 respectively rearwardly and forwardly of the plunger 329. These springs 331, 332 are not compressed until toward the ends of pedal release and kick-down depression respectively. When the accelerator pedal is operated for the kick-down release of the braking means J, the Bowden wire 186 is pulled forwardly by pin 220ᶜ picking up sector 220ᵃ to move plunger 329 forwardly to load the spring 332 until toward the end of the kick-down movement of the accelerator pedal the force acting through the spring 332 is sufficient to cause release of the detent 326 whereupon the valve member 263' will be quickly moved forwardly to the kick-down position and detent 327 will be engaged by the ball 325. When the accelerator pedal is released, the aforesaid spring 217 will cause a rearward thrust of the Bowden wire 186 to then load the spring 331 so that toward the end of the accelerator pedal release the spring 331 will cause the release of the detent 327 and engagement of detent 326 to restore the valve member 263' to the Fig. 26 position and to thereby restore the operation of the braking means J.

It will be apparent that the valve member 263' is always in one of its positions of control or in the other viz., the valve member has one or the other of detents 326 or 327 engaged by ball 325 except, of course, for the brief interval when the valve moves between these detent positions with a snap-action.

If desired the Bowden wire 186 may be directly connected to move with lever 218 without lost motion in which instance, as in Fig. 27, the extensions 320 and 322 are made longer than in Fig. 26 to accommodate the added travel of the plunger 329 which now moves with the accelerator pedal throughout both ranges of depression. Clearance is preferably provided between the plunger and springs 331, 332 so that these springs would not be compressed by the plunger until the accelerator pedal approaches the opposite limits of its travel. By making spring 331 longer the valve member 263' will effect operation of brake J earlier, after kick-down, in the releasing throttle-closing movement of the accelerator pedal, as desired.

We do not limit our invention, in the broader aspects thereof, to any particular combination and arrangement of parts such as shown and described for illustrative purposes since various modifications will be apparent from the teachings of our invention and scope thereof as defined in the appended claims.

What we claim is:

1. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving connecting means comprising gearing for driving the driven shaft from the driving shaft at a speed different from that of the driving shaft when said clutching members are engaged; and drive control means operable in response to driver operation of said throttle valve actuator in said second range of movement for effecting release of said different speed drive.

2. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft;

means for drivingly connecting the other of said clutching members with the driven shaft; one of said driving connecting means comprising gearing for driving the driven shaft from the driving shaft at a speed different from that of the driving shaft when said clutching members are engaged; and drive control means operable in response to driver operation of said throttle valve actuator in said second range of movement for effecting release of said different speed drive without disengaging said clutching members, said drive control means operating to restore said different speed drive in response to movement of said throttle valve actuator from said second range to said first range.

3. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving connecting means comprising gearing for driving the driven shaft from the driving shaft at a speed different from that of the driving shaft when said clutching members are engaged; means limiting clutching engagement of said clutching members to substantially synchronous rotation of said clutching members; means releasably driving the driven shaft from the driving shaft independently of said speed responsive clutch means, said clutching members being driven at relatively different speeds during operation of said releasable driving means; and drive control means operable in response to driver operation of said throttle valve actuator in said second range of movement for effecting release of said different speed drive while maintaining clutching engagement of said clutching members.

4. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; a clutch; means for driving the driven shaft from the driving shaft independently of said clutch at a relatively slow speed releasable to accommodate a further drive from the driving shaft to the driven shaft through said clutch relatively faster than said relatively slow speed drive; means for driving the driven shaft from the driving shaft for said relatively fast speed drive; said fast driving means including said clutch operating to control the drive through said fast driving means; and drive control means operable in response to said overtravel movement of said throttle valve actuator for effecting release of said relatively fast speed drive without disengaging said clutch.

5. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; means for releasably driving the driven shaft from the driving shaft; an automatically operating clutch comprising relatively engageable clutching members one of which is adapted for centrifugal force movement to engage the other, said clutching members being so constructed and arranged that their engagement is limited to substantially synchronous rotation thereof; means for driving one of said clutching members from one of said shafts during operation of said releasable drive; means for driving the other of said clutching members from the other of said shafts at a speed different from that of the first said clutching member during operation of said releasable drive; said driving means for said clutching members providing a drive through said clutch for driving said driven shaft from said driving shaft at a speed faster than that provided by said releasable driving means; operation of said throttle valve actuator within said first range of movement effecting release of said releasable driving means for slowing down the speed of said driving-shaft-driven-clutching-member relative to the speed of said driven-shaft-driven-clutching-member to substantially synchronize the speeds of said clutching members to effect engagement thereof; and drive control means operable in response to operation of said throttle valve actuator in said second range of movement to effect release of said faster drive while maintaining said clutching members engaged.

6. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; gearing means operable to drive the driven shaft from the driving shaft; a clutch engageable to effect the drive through said gearing means in response to operation of said throttle valve actuator in its first said range of movement; and means operable in response to operation of said throttle valve actuator in its second said range of movement for effecting release of the drive through said gearing means while maintaining engagement of said clutch.

7. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving connecting means comprising gearing for driving the driven shaft from the driving shaft at a speed different from that of the driving shaft when said clutching members are engaged; said gearing including a rotatable drive-reaction-taking element; releasable means operating to hold said element against rotation; and means operable in response to driver operation of said throttle valve actuator in said second range of movement for effecting release of said holding means.

8. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; speed responsive clutch means including driving and driven clutching members adapted for clutching engagement; means for drivingly connecting one of said clutching members with the driving shaft; means for drivingly connecting the other of said clutching members with the driven shaft; one of said driving connecting means comprising gearing for driving the driven shaft from the driving shaft at a speed different from that of the driving shaft when said clutching members are engaged, said gearing including a rotatable drive-reaction-taking element; releasable means operating to hold said element against rotation; and means operable in response to driver operation of said throttle valve actuator in said second range of movement for effecting release of said holding means without disengaging said clutching members, the last said means operating to restore operation of said holding means in response to movement of said throttle valve actuator from said second range to said first range.

9. In a drive for a motor vehicle having an engine provided with a throttle valve actuator operable by the driver throughout a range of movement in adjusting the throttle valve between its fully opened and closed positions; mean accommodating driver operation of said throttle valve actuator throughout its said range of movement and therebeyond in a second range of movement overtravelling the throttle valve; a driving shaft adapted to receive drive from the engine; a driven shaft adapted to drive the vehicle; means for driving the driven shaft from the driving shaft at a relatively slow speed releasable to accommodate a further drive from the driving shaft to the driven shaft relatively faster than said relatively slow speed drive; means for driving the driven shaft from the driving shaft for said relatively fast speed drive; said fast driving means including a clutch for controlling the drive through said fast driving means; said fast driving means including a rotatable drive-reaction-taking element; releasable braking means for holding said element against rotation; and means operable in response to said overtravel movement of said throttle valve actuator for effecting release of said braking means.

10. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; means for releasably driving the driven shaft from the driving shaft; an automatically operating clutch comprising relatively engageable clutching members one of which is adapted for centrifugal force movement to engage the other, said clutching members being so constructed and arranged that their engagement is limited to substantially synchronous rotation thereof; means for driving one of said clutching members from one of said shafts during operation of said releasable drive; means for driving the other of said clutching members from the other of said shafts at a speed different from that of the first said clutching member during operation of said releasable drive; said driving means for said clutching members providing a drive through said clutch for driving said driven shaft from said driving shaft at a speed faster than that provided by said releasable driving means; operation of said throttle valve actuator within said first range of movement effecting release of said releasable driving means for slowing down the speed of said driving-shaft-driven-clutching-member relative to the speed of said driven-shaft-driven-clutching-member to substantially synchronize the speeds of said clutching members to effect engagement thereof; one of said clutching-member-driving-means including a rotatable drive-reaction-taking element; releasable braking means for holding said element against rotation; and means operable in response to operation of said throttle valve actuator in said second range of movement to effect release of said braking means.

11. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; gearing means operable to drive the driven shaft from the driving shaft; said gearing means including a rotatable drive-reaction-taking element; releasable braking means operable to hold said element against rotation; a clutch engageable to effect the drive through said gearing means in response to operation of said throttle valve actuator in its first said range of movement when said element is held by said braking means; and means operable in response to operation of said throttle valve actuator in its second said range of movement for effecting release of said braking means.

12. In a drive for a motor vehicle having an engine provided with a throttle valve; an accelerator pedal operably connected to said throttle valve for adjustment thereof by the vehicle driver; a driving shaft; a driven shaft; primary driving means for connecting said driving shaft to said driven shaft so as to rotate said driven shaft at a speed equal to the speed of said driving shaft, said primary driving means including a one-way clutch; secondary driving means adapted to connect said driving and driven shafts so as to drive said driven shaft at a speed faster than that of said driving shaft, said secondary driving means including planetary gearing comprising a planet pinion and carrier therefor adapted to be driven from the driving shaft, said gearing further comprising a sun gear meshing with the planet pinion and an internal gear meshing with the planet pinion and adapted to transmit the drive to said driven shaft, said secondary driving means including a fluid-actuated brake for restraining rotation of the sun gear; means including a valve for supplying fluid under pressure to said fluid-actuated brake to operate the same during operation of said primary and secondary driving means; said secondary driving means including a clutch for controlling said faster speed drive; and means operable in response to driver manipulation of said accelerator pedal for actuating said valve to effect release of said fluid-actuated brake.

13. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; primary driving means for connecting said driving shaft to said driven shaft so as to rotate said driven shaft at a speed equal to the speed of said driving shaft, said primary driving means including a one-way clutch; secondary driving means adapted to connect said driving and driven shafts so as to drive said driven shaft at a speed faster than that of said driving shaft, said secondary driving means including planetary gearing comprising a planet pinion and carrier therefor adapted to be driven from the driving shaft, said gearing further comprising a sun gear meshing with the planet pinion and an internal gear meshing with the planet pinion and adapted to transmit the drive to said driven shaft, said secondary driving means including a fluid-actuated brake for restraining rotation of the sun gear; means for supplying fluid under pressure to said fluid-actuated brake to operate the same; and means operable in response to driver operation of said throttle valve actuator in said second range of movement for effecting release of said fluid-actuated brake.

14. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; primary driving means for connecting said driving shaft to said driven shaft so as to rotate said driven shaft at a speed equal to the speed of said driving shaft, said primary driving means including a one-way clutch; secondary driving means adapted to connect said driving and driven shafts so as to drive said driven shaft at a speed faster than that of said driving shaft, said secondary driving means including planetary gearing comprising a planet pinion and carrier therefor adapted to be driven from the driving shaft, said gearing further comprising a sun gear meshing with the planet pinion and an internal gear meshing with the planet pinion and adapted to transmit the drive to said driven shaft, said secondary driving means including a fluid-actuated brake for restraining rotation of the sun gear; means including a valve for supplying fluid under pressure to said fluid-actuated brake to operate the same during operation of said secondary driving means; and means operable in response to driver operation of said throttle valve actuator in said second range of movement for actuating said valve to effect release of said fluid-actuated brake.

15. In a drive for a motor vehicle having an engine provided with a throttle-valve actuator operable by the driver throughout a range of movement in adjusting the throttle-valve between its limits of opening and closing positions, means accommodating driver operation of said actuator throughout its said range of movement and therebeyond, a transmission for driving the vehicle from the engine in a plurality of variable speed ratio drives, means providing a drive through the transmission, means providing an additional drive through the transmission faster than that provided by the first said driving means, a pressure fluid motor operable to control said faster drive means, means for supplying fluid under pressure to said motor for operating the same when said throttle-valve actuator is operated in said range of movement, and means operable in response to operation of said throttle-valve actuator beyond said range of movement for effecting release of said motor from said pressure fluid operation.

16. In a drive for a motor vehicle having an engine provided with a throttle-valve actuator operable by the driver throughout a range of movement in adjusting the throttle-valve between its limits of opening and closing positions, means accommodating driver operation of said actuator throughout its said range of movement and therebeyond, a transmission for driving the vehicle from the engine in a plurality of variable speed ratio drives, means providing a drive through the transmission, a pressure fluid motor operable to control said drive means, means including a valve for supplying fluid under pressure to said motor for operating the same when said throttle-valve actuator is operated by the driver in said range of movement, means operable independently of said pressure fluid supplying means providing an additional drive through the transmission slower than that provided by the first said drive means, and means operable in response to driver operation of said throttle-valve actuator beyond said range of movement for operating said valve to effect release of said motor from said pressure fluid operation.

17. In a motor vehicle transmission of the character described, power driving means, means driven by said driving means and adapted to drive the vehicle, change speed mechanism operable to drive the driven means from the driving means at a plurality of relatively different speed ratios, pressure fluid operated means for controlling one of said speed ratio drives, a casing for said mechanism having a fluid lubricant reservoir, valving means carried by said casing, a pump surrounding said power driven means and operated thereby to deliver fluid from said reservoir under pressure to said valving means for passage to said pressure fluid operated means, driver operated means for operating said valving means to control said delivery of pressure fluid from said pump to said pressure fluid operated means, and means for supplying fluid from said valving means to lubricate said mechanism continuously during operation of said pump.

18. In a drive for a motor vehicle having an engine provided with a throttle-valve actuator operable by the vehicle driver, a transmission for driving the vehicle from the engine in a plurality of variable speed ratio drives, means providing a relatively fast drive through the transmission, means including a fluid-actuated device for controlling said relatively fast drive to effect operation and release thereof, valving means operable from a first position of pressure fluid supply to said fluid-actuated device to a second position for venting said fluid-actuated device, follower mechanism operably connected to said valving means, leader mechanism adapted for actuation by driver operation of said throttle-valve actuator, yielding means operably connecting said leader mechanism with said follower mechanism for operating said valving means from one of its said positions to another in response to driver operation of said throttle-valve actuator thereby effecting release of said relatively fast drive, and means providing an additional drive through the transmission slower than said relatively fast drive when said valving means is operated as aforesaid to effect release of said relatively fast drive.

19. In a drive for a motor vehicle having an engine provided with a throttle-valve actuator operable by the vehicle driver, a transmission for driving the vehicle from the engine in a plurality of variable speed ratio drives, means providing a relatively fast drive through the transmission, means including a fluid-actuated device for controlling said relatively fast drive to effect operation and release thereof, valving means operable from a first position of pressure fluid supply to said fluid-actuated device to a second position for venting said fluid-actuated device, follower mechanism operably connected to said valving means, leader mechanism adapted for actuation by driver operation of said throttle-valve actuator, a pivotally supported lever having a weight at one end thereof, a lost-motion connection between said lever and said follower mechanism, yielding means operably connecting said lever with said leader mechanism, and means for actuating said leader mechanism in response to driver operation of said throttle valve actuator to thereby effect operation of said follower mechanism to operate said valving means from one of its said positions to the other for releasing said relatively fast drive, and means providing an additional drive through the transmission slower than said relatively fast drive when said valving means is operated as aforesaid to effect release of said relatively fast drive.

20. In a drive for a motor vehicle having an engine provided with a throttle-valve actuator operable by the driver throughout a range of movement in adjusting the throttle-valve between its limits of opening and closing positions, means accommodating driver operation of said actuator throughout its said range of movement and therebeyond, a transmission for driving the vehicle from the engine in a plurality of variable speed ratio drives, means providing a drive through the transmission, means including a fluid-actuated device for controlling said transmission drive to effect operation and release thereof, valving means operable to control pressure fluid operation of said fluid-actuated device, and lost motion mechanism for operating said valving means in response to driver operation of said throttle-valve actuator beyond its said range of throttle-valve adjusting movement to effect release of said transmission drive, said mechanism including means for operating said valving means to effect operation of said transmission drive in response to operation of said throttle-valve actuator from beyond said range of movement to a position well within said range of movement.

21. In a drive for a motor vehicle having an engine provided with a throttle-valve actuator operable by the driver throughout a range of movement in adjusting the throttle-valve between its limits of opening and closing positions, means accommodating driver operation of said actuator throughout its said range of movement and therebeyond, a transmission for driving the vehicle from the engine in a plurality of variable speed ratio drives, means providing a drive through the transmission, means including a fluid-actuated device for controlling said transmission drive to effect operation and release thereof, valving means operable to control pressure fluid operation of said fluid-actuated device, mechanism for operating said valving means in response to driver operation of said throttle-valve actuator with differential operation of the valving means with respect to operation of said actuator so arranged that movement of said actuator beyond its said range operates said valving means but restoring movement of said valving means is delayed until said actuator is moved well to a position within said range.

22. In a motor vehicle drive of the character described, a driving shaft, a driven shaft formed with an enlarged end portion, an overrunning clutch between the driving shaft and said enlarged portion of the driven shaft for releasably driving the driven shaft from the driving shaft, a casing structure for said mechanism providing a lubricant reservoir, said enlarged shaft portion having a lubricant conducting passage directed inwardly toward said overrunning clutch, an annular lubricant deflector carried by said enlarged shaft portion and having an opening adjacent thereto, a trough supported by said casing structure and having an outlet for directing lubricant toward said deflector opening, and means including a pump for conducting lubricant from said reservoir to said trough for gravity flow through said trough outlet toward said deflector opening.

23. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine a driven shaft adapted to drive the vehicle; means for driving the driven shaft from the driving shaft releasable to accommodate a relatively faster drive of the driven shaft from the driving shaft; clutch means comprising relatively engageable clutch members one of which is adapted for movement to engage the other, and means limiting their engagement to substantially synchroous rotation thereof; means including said clutch means when the members thereof are synchronously engaged to provide said relatively faster drive; and drive control means operable in response to operation of said throttle valve actuator in said second range of movement to effect release of said relatively faster drive.

24. In a drive for a motor vehicle having an engine provided with a throttle valve actuator operable by the driver throughout a range of movement in adjusting the throttle valve between its fully opened and closed positions; means accommodating driver operation of said throttle valve actuator throughout its said range of movement and therebeyond in a second range of movement overtravelling the throttle valve; a driving shaft adapted to receive drive from the engine; a driven shaft adapted to drive the vehicle; means including an overrunning clutch for releasably driving the driven shaft from the driving shaft; means for driving the driven shaft from the driving shaft relatively faster than the aforesaid drive, comprising relatively engageable clutch members one of which is adapted for movement to engage the other, and means limiting their engagement to substantially synchronous rotation thereof when said throttle valve actuator is released; and drive control means operable in response to operation of said throttle valve operator in said second range of movement to effect release of said relatively faster drive and accommodate motor vehicle drive through the first said driving means.

25. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, transmission mechanism operable to provide at least three forward drives of relatively different predetermined fixed speed ratio from the engine to the vehicle the fastest of which drives is an overdrive, and means operable in response to operation of said throttle actuator beyond its said limit of throttle opening movement for effecting control of the operation of said transmission mechanism to step-down the speed ratio drive only from the overdrive to another of said three drives.

26. In a drive for a motor vehicle having an engine provided with a throttle actuator operable by the driver throughout a range of movement in adjusting the throttle between its limit of opening and closing positions, means accommodating driver operation of said actuator from its throttle closing position to the limit of its throttle opening position and therebeyond, transmission mechanism operable to provide at least three forward drives of relatively different predetermined fixed speed ratio from the engine to the vehicle, pressure fluid operated means for controlling at least the fastest of said drives, operating means for controlling at least one of the other of said three drives independently of the pressure fluid, means operable in response to operation of said throttle actuator beyond the limit of its said throttle opening position for effecting control of the operation of said pressure fluid operated means to step-down the speed ratio drive, said step-down control means being so arranged as not to change the transmission drive in either of the other two of said three drives, and means operable to effect operation and release of said other two drives independently of operation of said step-down control means as aforesaid.

27. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, and change speed means operable in response to operation of said throttle valve actuator beyond its said range of movement for effecting change in the drive through said transmission means from the faster of said pair of drives to another of said drives, said transmission means including an overrunning control device operably associated with the slower of said pair of driving means and adapted to automatically release this drive in response to operation of the faster of said pair of driving means.

28. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, and change speed means operable in response to operation of said throttle valve actuator beyond its said range of movement for effecting change in the drive through said transmission means from the faster of said pair of drives to the slower of said pair of drives, said transmission means including an overrunning control device operably associated with the slower of said pair of driving means and adapted to automatically release this drive in response to operation of the faster of said pair of driving means.

29. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, change speed means operable in response to operation of said throttle valve actuator beyond its said range of movement for effecting change in the drive through said transmision means from the faster of said pair of drives to another of said drives, and means effecting operation and release of said relatively slow speed drive and the slower of said pair of drives independently of operation of said change speed means, the said means for effecting operation and release of the slower of said pair of drives comprising an overrunning control device operably associated therewith and adapted to automatically release this drive in response to operation of the faster of said pair of drives.

30. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, a transmission for driving the vehicle from the engine in a plurality of variable speed ratio drives, means providing a drive through the transmission, means providing an additional drive through the transmission faster than that provided by the first said drive means, a pressure fluid motor operable to control said faster drive means, a source of liquid, means including a pump for supplying said liquid under pressure to said motor, means operable in response to operation of said throttle valve actuator beyond its said range of movement for shutting off said pressure liquid supply from said pump to said motor, and means operating to effect operation and release of the first recited drive means independently of said liquid supplying means and independently of operation of the throttle valve actuator beyond its said range of movement.

31. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, transmission mechanism operable to provide at least three forward drives of relatively different predetermined fixed speed ratio from the engine to the vehicle, a control element cooperably associated with said throttle actuator for operation of the control element from a first position to a second position in response to operation of said throttle actuator beyond its said limit of throttle opening movement, said throttle actuator being movable from the limit of its throttle closing movement to the limit of its throttle opening movement without tending to cause operation of said control element from its said first position to its said second position, means operating in response to operation of said control element from its said first position to its said second position to effect control on the operation of said transmission mechanism to step-down the speed ratio drive, and means limiting operation of said step-down control means during operation of said three drives to vehicle drive in the fastest of said three drives, one of said three drives other than the fastest thereof comprising an overrunning control device operably associated therewith and adapted to automatically release this one drive in response to operation of the fastest of said three drives.

32. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, transmission mechanism operable to provide a relatively slow drive and a relatively fast drive from the engine to the vehicle, means operable in response to operation of said throttle actuator beyond its said limit of throttle opening movement for effecting control on the operation of said transmission mechanism to step-down the drive from said relatively fast drive to said relatively slow drive, means acting to urge movement of said throttle actuator to its throttle closing position, and means operating to restore said relatively fast drive in response to driver release of said throttle actuator limited in the operation thereof to movement of said throttle actuator to a position thereof in excess of approximately one-half of its travel in said range of movement and in a direction toward the closed throttle position thereof.

33. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, transmission mechanism embodying means operable to provide relatively slow and fast drives from the engine to the vehicle, the fast drive means comprising positively engageable clutch members operably associated therewith and adapted for engagement only when synchronized by engine coast, the slow drive means comprising a drive control device operably associated therewith and adapted to automatically release this drive to accommodate engine coast sufficiently to synchronize said clutch members, and means operating in response to operation of said throttle actuator beyond its said limit of throttle opening movement for releasing the fast drive means and accommodating operation of the slow drive means.

34. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, braking means for controlling the faster of said pair of drives, and change speed means operable in response to operation of said throttle valve actuator beyond its said range of movement for controlling said braking means to effect change in the drive through said transmission means from the faster of said pair of drives to the slower of said pair of drives, said change speed means being incapable of effecting change in the drive through said transmission means by operation of said throttle valve actuator beyond its said range of movement when the slower of said pair of drives is operating.

35. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, braking means for controlling the faster of said pair of drives, change speed means operable in response to operation of said throttle valve actuator beyond its said range of movement for controlling said braking means to effect change in the drive through said transmission means from the faster of said pair of drives to the slower of said pair of drives, said change speed means being incapable of effecting change in the drive through said transmission means by operation of said throttle valve actuator beyond its said range of movement when the slower of said pair of drives is operating, and means effecting operation and release of said relatively slow speed drive and the slower of said pair of drives independently of operation of said change speed means.

36. In a drive for a motor vehicle having an engine provided with a throttle valve actuator operable by the driver throughout a range of movement in adjusting the throttle valve between its fully opened and closed positions, means accommodating driver operation of said throttle valve actuator throughout its said range of movement and therebeyond in a second range of movement overtravelling the throttle valve, a driving shaft adapted to receive drive from the engine, a driven shaft adapted to drive the vehicle, speed responsive clutch means including driving and driven clutching members adapted for clutching engagement, means for drivingly connecting one of said clutching members with the driving shaft, means for drivingly connecting the other of said clutching members with the driven shaft, one of said driving connecting means comprising gearing for driving the driven shaft from the driving shaft at a speed different from that of the driving shaft when said clutching members are engaged, and drive control means operable in response to drive operation of said throttle valve actuator in said second range of movement for effecting release of said different speed drive.

37. In a drive for a motor vehicle having an engine provided with a throttle valve actuator operable by the driver throughout a range of movement in adjusting the throttle valve between its fully opened and fully closed positions, means accommodating driver operation of said throttle valve actuator throughout its said range of movement and therebeyond in a second range of movement overtravelling the throttle valve, a driving shaft adapted to receive drive from the engine, a driven shaft adapted to drive the vehicle, gearing means operable to drive the driven shaft from the driving shaft, a clutch engageable to effect the drive through said gearing means in response to operation of said throttle valve actuator in its first said range of movement, means operable in response to operation of said throttle valve actuator in its second range of movement for effecting release of the drive through said gearing means while maintaining engagement of said clutch, and means responsive to movement of said actuator from said second range of movement for restoring the drive through said gearing.

38. In a drive for a motor vehicle according to claim 23, means operating in response to predetermined speed of travel of the vehicle for effecting release of the relatively faster drive automatically during retardation of the vehicle with said shafts drivingly connected through said relatively faster driving means.

CARL A. NERACHER.
AUGUSTIN J. SYROVY.
ROY T. BUCY.
OTTO W. SCHOTZ.